US011082863B2

(12) United States Patent
Lee et al.

(10) Patent No.: US 11,082,863 B2
(45) Date of Patent: *Aug. 3, 2021

(54) METHODS AND APPARATUS FOR BEAMFORMING AND INITIAL ACCESS

(71) Applicant: InterDigital Patent Holdings, Inc., Wilmington, DE (US)

(72) Inventors: Moon-il Lee, Melville, NY (US); Janet A. Stern-Berkowitz, Little Neck, NY (US); Virgil Comsa, Montreal (CA); Meilong Jiang, Westfield, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/538,379

(22) Filed: Aug. 12, 2019

(65) Prior Publication Data

US 2019/0364439 A1 Nov. 28, 2019

Related U.S. Application Data

(63) Continuation of application No. 15/669,291, filed on Aug. 4, 2017, now Pat. No. 10,382,978, which is a (Continued)

(51) Int. Cl.
*H04W 16/28* (2009.01)
*H04B 7/0417* (2017.01)
(Continued)

(52) U.S. Cl.
CPC .......... *H04W 16/28* (2013.01); *H04B 7/0417* (2013.01); *H04B 7/061* (2013.01);
(Continued)

(58) Field of Classification Search
CPC ... H04W 16/28; H04W 52/365; H04W 24/10; H04W 74/0833; H04L 5/0048;
(Continued)

(56) References Cited

U.S. PATENT DOCUMENTS 6,768,913 B1 7/2004 Molnar et al.
7,349,371 B2 3/2008 Schein et al.
(Continued)

FOREIGN PATENT DOCUMENTS

CN 102548016 A 7/2012
CN 102714807 A 10/2012

OTHER PUBLICATIONS

"LTE Release 12 and Beyond," 3GPP RAN WS on Rel-12 and onwards, RWS-120003 Ljubljana, Slovenia (Jun. 11-12, 2012).
(Continued)

*Primary Examiner* — Ivan O Latorre
(74) *Attorney, Agent, or Firm* — Volpe Koenig

(57) ABSTRACT

A method and apparatus for determining Physical Random Access Channel (PRACH) resources and using beams are disclosed herein. In an example, a wireless transmit/receive unit (WTRU) may measure a plurality of beam reference signals transmitted from a base station. Further, the WTRU may select a beam reference signal from among the plurality of measured beam reference signals. Also, the WTRU may receive a configuration message from the base station that includes correspondence information regarding the plurality of beam reference signals, wherein the correspondence information designates at least one set of PRACH resources for each of the plurality of beam reference signals. In addition, the WTRU may determine a set of PRACH resources designated for the selected beam reference signal based on the received correspondence information. Moreover, the WTRU may transmit a PRACH signal using at least one PRACH resource of the determined set of PRACH resources.

20 Claims, 15 Drawing Sheets

Related U.S. Application Data continuation of application No. 14/763,113, filed as application No. PCT/US2014/012914 on Jan. 24, 2014, now abandoned.

(60) Provisional application No. 61/756,792, filed on Jan. 25, 2013.

(51) Int. Cl.
*H04B 7/06* (2006.01)
*H04B 7/08* (2006.01)
*H04W 52/36* (2009.01)
*H04L 5/00* (2006.01)
*H04W 24/10* (2009.01)
*H04W 74/08* (2009.01)

(52) U.S. Cl.
CPC ......... *H04B 7/0617* (2013.01); *H04B 7/0626* (2013.01); *H04B 7/086* (2013.01); *H04B 7/088* (2013.01); *H04L 5/0048* (2013.01); *H04W 24/10* (2013.01); *H04W 52/365* (2013.01); *H04W 74/0833* (2013.01)

(58) Field of Classification Search
CPC .... H04B 7/0417; H04B 7/061; H04B 7/0617; H04B 7/0626; H04B 7/086; H04B 7/088
See application file for complete search history.

(56) References Cited

U.S. PATENT DOCUMENTS

| | | | |
|---|---|---|---|
| 8,913,682 | B2 | 12/2014 | Nam et al. |
| 10,257,864 | B2 | 4/2019 | Zhao et al. |
| 2002/0159506 | A1 | 10/2002 | Alamouti et al. |
| 2009/0170514 | A1 | 7/2009 | Yokoyama |
| 2009/0175161 | A1 | 7/2009 | Yi et al. |
| 2009/0280867 | A1 | 11/2009 | Hovers et al. |
| 2010/0267341 | A1 | 10/2010 | Bergel et al. |
| 2011/0268049 | A1 | 11/2011 | Luo et al. |
| 2012/0287875 | A1 | 11/2012 | Kim et al. |
| 2013/0021952 | A1 | 1/2013 | Jeong et al. |
| 2013/0029657 | A1 | 1/2013 | Gao et al. |
| 2013/0040684 | A1 | 2/2013 | Yu et al. |
| 2013/0083774 | A1 | 4/2013 | Son et al. |
| 2013/0102345 | A1 | 4/2013 | Jung |
| 2013/0182683 | A1 | 7/2013 | Seol et al. |
| 2013/0265899 | A1 | 10/2013 | Sayana et al. |
| 2013/0272220 | A1 | 10/2013 | Li et al. |
| 2013/0308714 | A1 | 11/2013 | Xu et al. |
| 2013/0336176 | A1 | 12/2013 | Rubin et al. |
| 2014/0003240 | A1 | 1/2014 | Chen et al. |
| 2014/0029684 | A1 | 1/2014 | Shirani-Mehr et al. |
| 2014/0177607 | A1 | 6/2014 | Li et al. |
| 2015/0105025 | A1 | 4/2015 | Zhang et al. |
| 2016/0001403 | A1 | 1/2016 | Matsumoto et al. |

OTHER PUBLICATIONS

Alcatel-Lucent Shanghai Bell et al., "Considerations on CSI feedback enhancements for high-priority antenna configurations," 3GPP TSG-RAN WG1 #66, R1-112420, Athens, Greece (Aug. 22-26, 2011).

Ericsson AB et al., "Views on Rel-12," RWD-120003, pp. 1-13 (Jun. 1, 2012).

Huawei et al., "Use scenarios for elevation beamforming," 3GPP TSG RAN WG1 Meeting #72, R1-130028, St. Julian's, Malta (Jan. 28-Feb. 1, 2013).

Third Generation Partnership Project, "Technical Specification Group Radio Access Network; Evolved Universal Terrestrial Radio Access (E-UTRA); Physical layer procedures (Release 11)," 3GPP TS 36.213 V11.1.0 (Dec. 2012).

Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).

Third Generation Partnership Project, "Technical Specification Group Radio Access Network; Evolved Universal Terrestrial Radio Access (E-UTRA); Physical layer procedures (Release 11)," 3 GPP TS 36.213 V11.5.0 (Dec. 2013).

Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).

Third Generation Partnership Project, "Technical Specification Group Radio Access Network; Evolved Universal Terrestrial Radio Access (E-UTRA); Physical layer procedures (Release 10)," 3GPP TS 36.213 V10.8.0 (Dec. 2012).

Third Generation Partnership Project, "Technical Specification Group Radio Access Network; Evolved Universal Terrestrial Radio Access (E-UTRA); Physical layer procedures (Release 10)," 3GPP TS 36.213 V10.11.0 (Dec. 2013).

Third Generation Partnership Project, "Technical Specification Group Radio Access Network; Evolved Universal Terrestrial Radio Access (E-UTRA); Physical layer procedures (Release 10)," 3GPP TS 36.213 V12.0.0 (Dec. 2013).

Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).

Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).

Third Generation Partnership Project, "Technical Specification Group Radio Access Network; Evolved Universal Terrestrial Radio Access (E-UTRA); Physical Channels and Modulation (Release 10)," 3GPP TS 36.211 V10.6.0 (Dec. 2012).

Third Generation Partnership Project, "Technical Specification Group Radio Access Network; Evolved Universal Terrestrial Radio Access (E-UTRA); Physical Channels and Modulation (Release 10)," 3GPP TS 36.211 V10.7.0 (Feb. 2013).

Third Generation Partnership Project, "Technical Specification Group Radio Access Network; Evolved Universal Terrestrial Radio Access (E-UTRA); Physical Channels and Modulation (Release 11)," 3GPP TS 36.211 V11.1.0 (Dec. 2012).

Third Generation Partnership Project, "Technical Specification Group Radio Access Network; Evolved Universal Terrestrial Radio Access (E-UTRA); Physical Channels and Modulation (Release 11)," 3GPP TS 36.211 V11.5.0 (Dec. 2013).

Third Generation Partnership Project, "Technical Specification Group Radio Access Network; Evolved Universal Terrestrial Radio Access (E-UTRA); Physical Channels and Modulation (Release 12)," 3GPP TS 36.211 V12.0.0 (Dec. 2013).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.18.0 (Dec. 2012).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.20.0 (Jun. 2013).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.13.0 (Dec. 2012).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.8.0 (Dec. 2012).

Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.2.0 (Dec. 2012).

(56) References Cited

OTHER PUBLICATIONS

Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.0.0 (Dec. 2013).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.6.0 (Dec. 2013).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.12.0 (Dec. 2013).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.17.0 (Dec. 2013).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.4.0 (Sep. 2011).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.7.0 (Dec. 2012).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.8.0 (Jun. 2013).
Third Generation Partnership Project, "Technical Specification Group Radio Access Network; Evolved Universal Terrestrial Radio Access (E-UTRA); Multiplexing and channel coding (Release 11)," 3GPP TS 36.212 V11.4.0 (Dec. 2013).
Third Generation Partnership Project, "Technical Specification Group Radio Access Network; Evolved Universal Terrestrial Radio Access (E-UTRA); Multiplexing and channel coding (Release 12)," 3GPP TS 36.212 V12.0.0 (Dec. 2013).
Third Generation Partnership Project, "Technical Specification Group Radio Access Network; Evolved Universal Terrestrial Radio Access (E-UTRA); Multiplexing and channel coding (Release 11)," 3GPP TS 36.212 V11.1.0 (Dec. 2012).
Third Generation Partnership Project, "Technical Specification Group Radio Access Network; Evolved Universal Terrestrial Radio Access (E-UTRA); Physical layer—Measurements (Release 8)," 3GPP TS 36.214 V8.7.0 (Sep. 2009).
Third Generation Partnership Project, "Technical Specification Group Radio Access Network; Evolved Universal Terrestrial Radio Access (E-UTRA); Physical layer; Measurements (Release 9)," 3GPP TS 36.214 V9.2.0 (Jun. 2010).
Third Generation Partnership Project, "Technical Specification Group Radio Access Network; Evolved Universal Terrestrial Radio Access (E-UTRA); Physical layer; Measurements (Release 10)," 3GPP TS 36.214 V10.1.0 (Mar. 2011).
Third Generation Partnership Project, "Technical Specification Group Radio Access Network; Evolved Universal Terrestrial Radio Access (E-UTRA); Physical layer; Measurements (Release 11)," 3GPP TS 36.214 V11.1.0 (Dec. 2012).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.12.0 (Mar. 2012).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.6.0 (Mar. 2012).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.7.0 (Dec. 2012).
Third Generation Partnership Project, "Technical Specification Group Radio Access Network; Evolved Universal Terrestrial Radio Access (E-UTRA); Medium Access Control (MAC) protocol specification (Release 11)," 3GPP TS 36.321 V11.1.0 (Dec. 2012).
Third Generation Partnership Project, "Technical Specification Group Radio Access Network; Evolved Universal Terrestrial Radio Access (E-UTRA); Medium Access Control (MAC) protocol specification (Release 11)," 3GPP TS 36.321 V11.4.0 (Dec. 2013).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.10.0 (Dec. 2013).
Third Generation Partnership Project, "Technical Specification Group Radio Access Network; Evolved Universal Terrestrial Radio Access (E-UTRA); Medium Access Control (MAC) protocol specification (Release 12)," 3GPP TS 36.321 V12.0.0 (Dec. 2013).

METHODS AND APPARATUS FOR BEAMFORMING AND INITIAL ACCESS

CROSS REFERENCE TO RELATED APPLICATIONS

This application is a continuation of U.S. patent application Ser. No. 15/669,291 filed Aug. 4, 2017, which issued as U.S. Pat. No. 10,382,978 on Aug. 13, 2019, which is a continuation of U.S. patent application Ser. No. 14/763,113 filed Jul. 23, 2015, which is the U.S. National Stage, under 35 U.S.C. § 371, of International Application No. PCT/US2014/012914 filed Jan. 24, 2014, which claims the benefit of U.S. Provisional Patent Application No. 61/756,792 filed Jan. 25, 2013, the contents of which are hereby incorporated by reference herein.

BACKGROUND

A reference signal (RS) may be classified as a wireless transmit/receive unit (WTRU)-specific reference (WTRU-RS) and a cell-specific reference signaling (CRS). The WTRU-RS may be used on for a specific WTRU so that the RS is transmitted for the resources allocated to the WTRU. On the other hand, the CRS may be shared by all WTRUs in a cell so that the RS is transmitted in a wideband manner. In addition, according to the usage of the RS, it may be further differentiated to at least one of a demodulation reference signal (DM-RS) and a channel-state-information reference signal (CSI-RS).

The DM-RS may be used only for a specific WTRU and the RS is typically precoded to exploit beamforming gain. The CRS may be defined for all WTRUs in a cell and may be used for demodulation and measurement purposes.

SUMMARY

A method and apparatus for determining a beam for reception are disclosed herein. A method in a wireless transmit/receive unit (WTRU) includes that the WTRU may receive a broadcast message from an evolved Node B (eNB) that includes information associated with a plurality of beam reference signals, wherein the information includes at least one set of Physical Random Access Channel (PRACH) resources associated with each of the plurality of beam reference signals. Further, the WTRU may measure reference signals transmitted on each of the plurality of beam reference signals. Then, the WTRU may select a beam reference signal from among the plurality of beam reference signals. In addition, the WTRU may transmit a PRACH preamble in a set of resources associated with the selected beam reference signal. The WTRU may then receive further communications from the eNB.

In an example, the information associated with the plurality of beam reference signals may include a plurality of measurement configurations. In another example, the PRACH preamble may be transmitted on an allocated frequency associated with the set of resources.

In a further example, the WTRU may select a beam reference signal based on a determination that a measured reference signal power is better on at least one beam reference signal. Also, the WTRU may select a beam reference signal based on predetermined criteria.

In an additional example, at least one set of PRACH resources may be portioned based on the number of the plurality of beam reference signals. In yet a further example, the beam reference signals may be beam tracking reference signals. Also, the beam reference signals may be Channel State Information-Reference Signals (CSI-RSs). In still a further example, the beam may be a 3-D beam.

In an additional example, an eNB may perform a method for determining a vertical beam for transmission. For example, the eNB may transmit a broadcast message to a WTRU that includes two or more CSI-RS configurations. Further, the eNB may receive a first measurement report from the WTRU including a received signal-to-interference plus noise ratio (SINR) metric for a cell-specific CSI-RS in an uplink subframe. Also, the eNB may receive a second measurement report from the WTRU including an SINR metric for each antenna port in the cell-specific CSI-RS associated with a vertical beam. In a further example, the transmitting communications may be based on the first measurement report and the second measurement report.

Another method and apparatus for determining a vertical beam for reception are disclosed herein. A method in a WTRU includes receiving a broadcast message from an eNB that includes information associated with a plurality of vertical beams, wherein the information includes at least one set of PRACH resources associated with each of the plurality of vertical beams, measuring reference signals transmitted on each of the plurality of vertical beams to select a reception vertical beam, transmitting a PRACH preamble in a set of resources associated with the selected reception vertical beam, and receiving communications from the eNB using the selected reception vertical beam.

A method and apparatus for determining PRACH resources and using beams are disclosed herein. In an example, a WTRU may measure a plurality of beam reference signals transmitted from a base station. Further, the WTRU may select a beam reference signal from among the plurality of measured beam reference signals. Also, the WTRU may receive a configuration message from the base station that includes correspondence information regarding the plurality of beam reference signals, wherein the correspondence information designates at least one set of PRACH resources for each of the plurality of beam reference signals. In an example, the configuration message may be a broadcast message. In another example, the configuration message may be a radio resource control (RRC) message. In addition, the WTRU may determine a set of PRACH resources designated for the selected beam reference signal based on the received correspondence information. Moreover, the WTRU may transmit a PRACH signal using at least one PRACH resource of the determined set of PRACH resources. The WTRU may then receive further communications from the eNB.

In a further example, the correspondence information regarding the plurality of beam reference signals may include a plurality of measurement configurations. In yet another example, the determined set of PRACH resources may include at least one PRACH preamble. Further, the PRACH signal may be a PRACH preamble in the determined set of PRACH resources. In still another example, the WTRU may select a beam reference signal based on a determination that a measured beam reference signal power is better than a threshold on at least one beam reference signal.

In an additional example, the determined set of PRACH resources may include at least one set of time resources. Further, the PRACH signal may be transmitted in one of the time resources of the set of time resources. Also, the PRACH signal may be based on the received correspondence information.

BRIEF DESCRIPTION OF THE DRAWINGS

A more detailed understanding may be had from the following description, given by way of example in conjunction with the accompanying drawings, wherein.

DETAILED DESCRIPTION

Figure 1A:
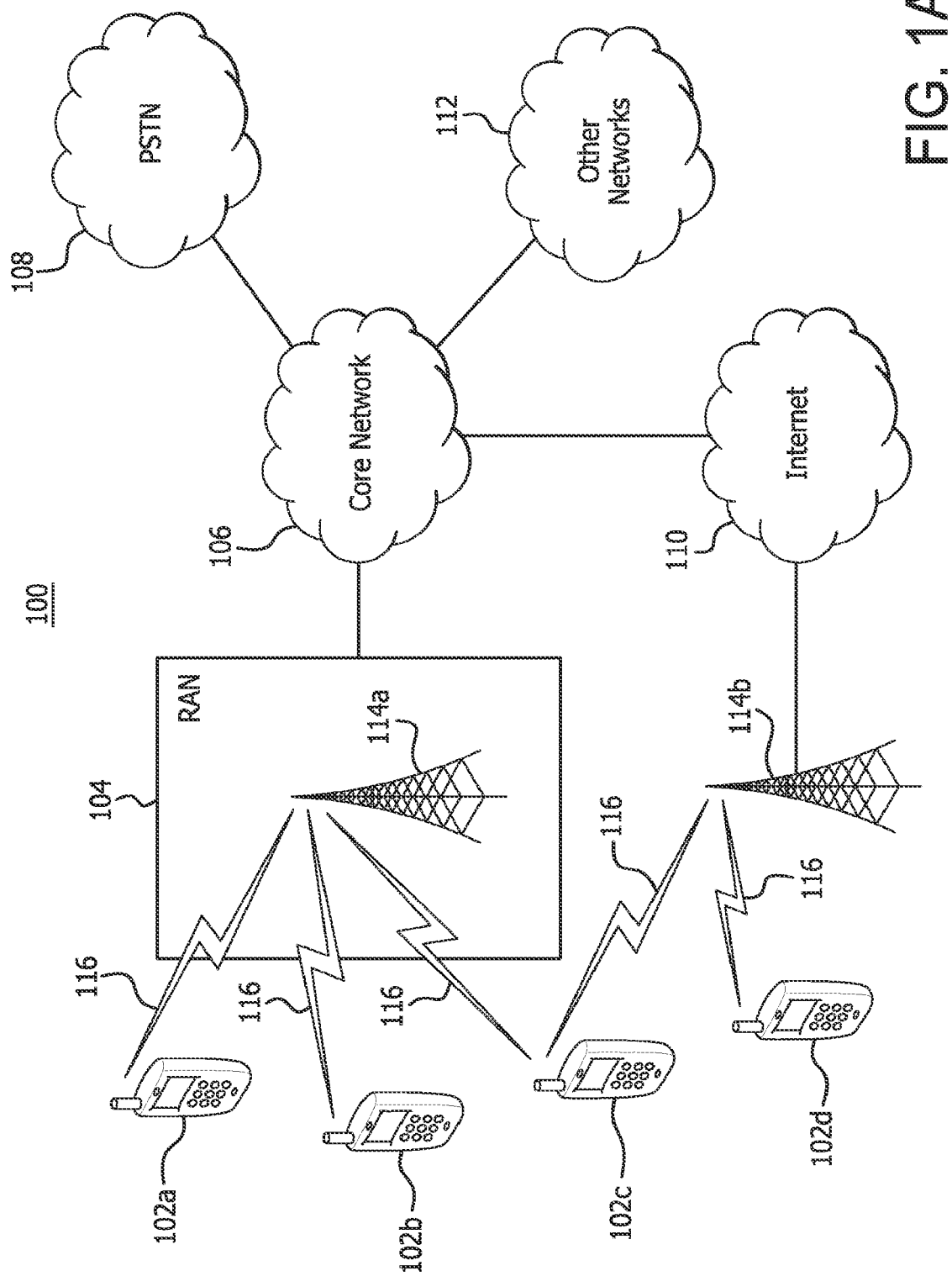
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
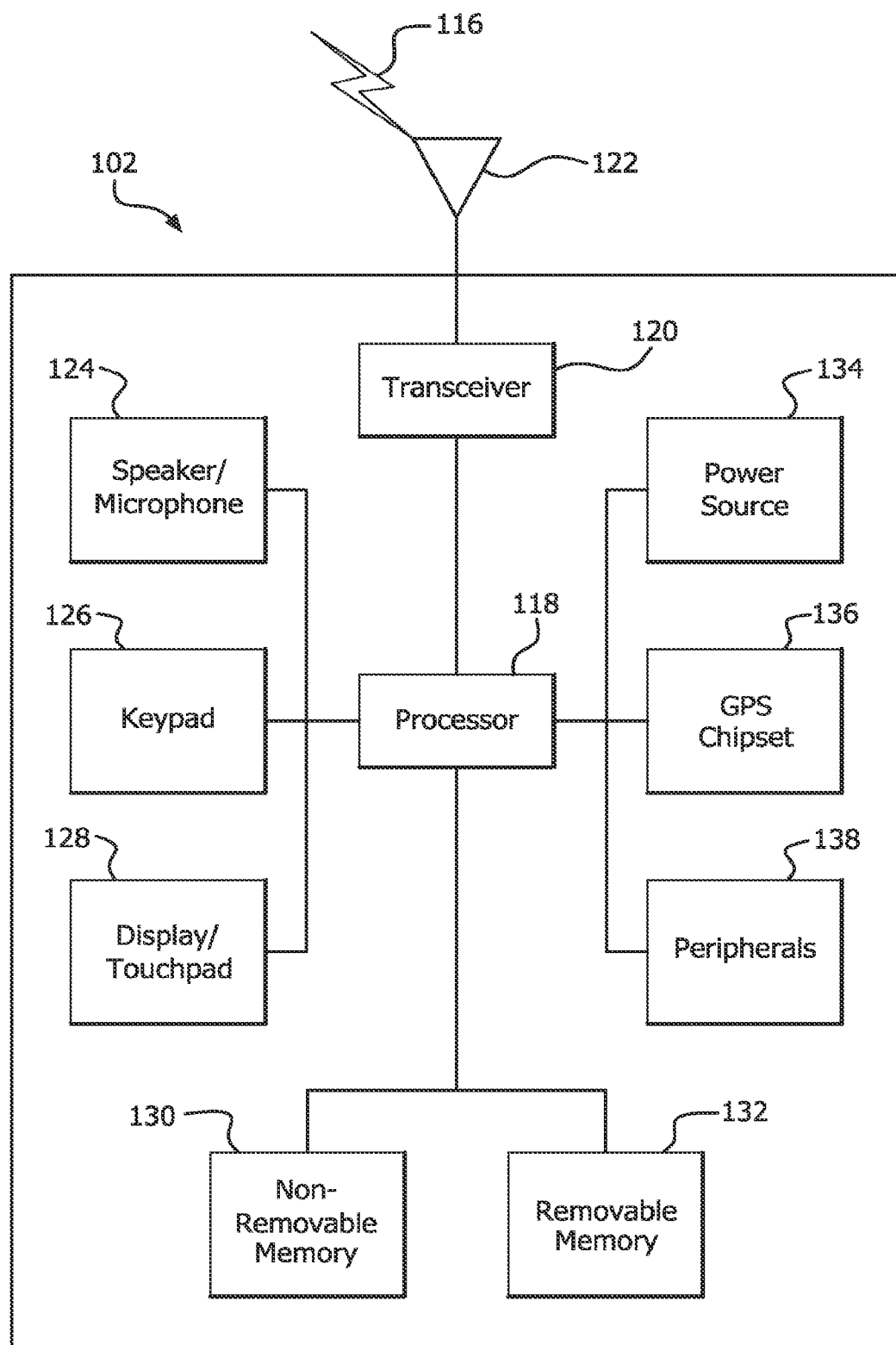
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
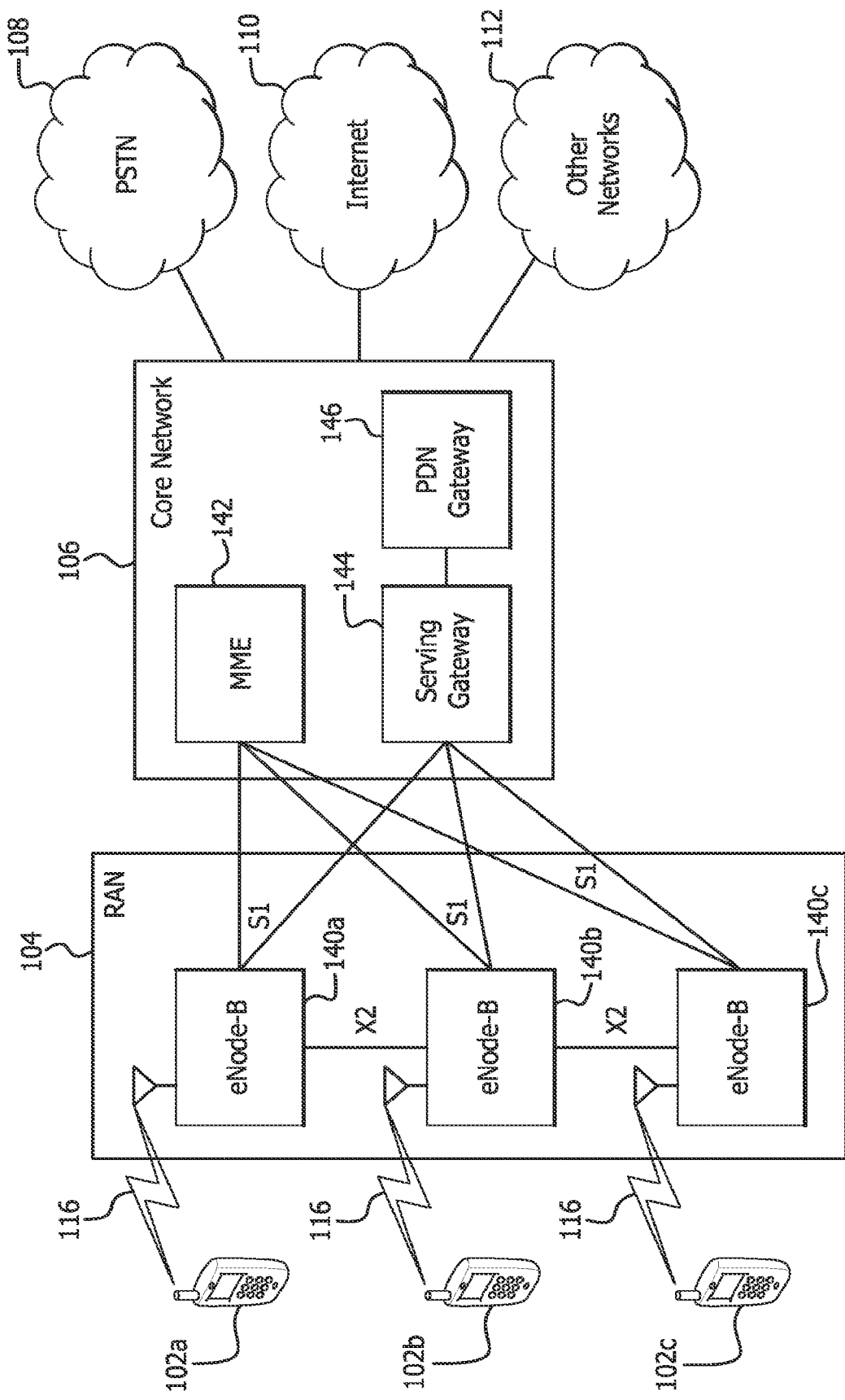
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

The reference signals (RSs) may be classified to a wireless transmit/receive unit (WTRU)-specific reference (WTRU-RS) and a cell-specific reference signaling (CRS). The WTRU-RS may be used only for a specific WTRU so that the RS is transmitted for the resources allocated to the WTRU. The CRS may be shared by all WTRUs in the cell so that the RS is transmitted in a wideband manner. Reference signals may be further differentiated from a demodulation reference signal (DM-RS) and a channel-state-information reference signal (CSI-RS).

The DM-RS may be used for a specific WTRU and the RS may typically be precoded to exploit beamforming gain. Since the WTRU-specific DM-RS is not shared with other WTRUs in the cell, the DM-RS may be transmitted in the time/frequency resources allocated for the WTRU. The DM-RS may only be used for demodulation purposes.

Figure 2:
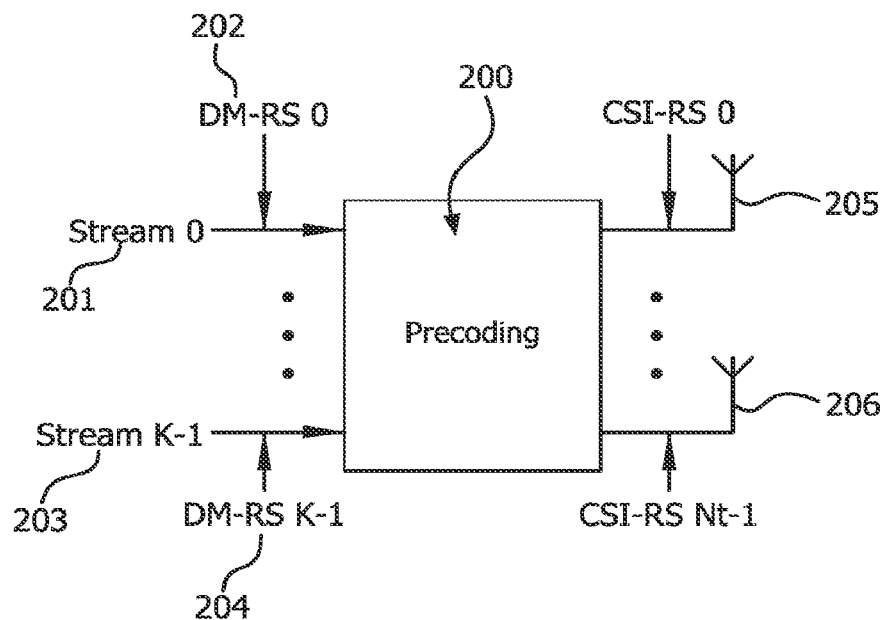
FIG. 2 is a diagram of a WTRU-specific precoded demodulation reference signal (DM-RS)

FIG. 2 is an example of a WTRU-specific precoded DM-RS. FIG. 2 includes a precoding entity 200. Stream 0 201 enters the precoding entity 200 with a DM-RS 0 202, Stream k-1 203 enters the precoding entity 200 with a DM-RS K-1 204. Stream 0 201 exits the precoding entity

200 with CSI-RS 0 205. Stream k-1 203 exits the precoding entity 200 with CSI-RS Nt-1 206.

FIG. 2 shows that if a precoded DM-RS is employed, the RS may be precoded with the same precoding used for data symbols and the same number of RS sequences corresponding to the number of layers K is transmitted. Here, K is equal to or smaller than the number of antenna ports $N_t$.

In FIG. 2, the K streams may be allocated for a WTRU or shared with multiple WTRUs. If multiple WTRUs share the K streams, the co-scheduled WTRUs may share the same time/frequency resources at the same time. If a precoded DM-RS is used, a measurement reference signal such as CSI-RS may be used together for a WTRU to measure channel state information.

The CRS may be defined for all WTRUs in a cell and may be used for demodulation and measurement purposes. Since the CRS is shared by all WTRUs, a non-precoded RS may typically be employed to keep the cell coverage uniform. The precoded RS may have different cell coverage according to the directions due to the beamforming effect.

Figure 3:
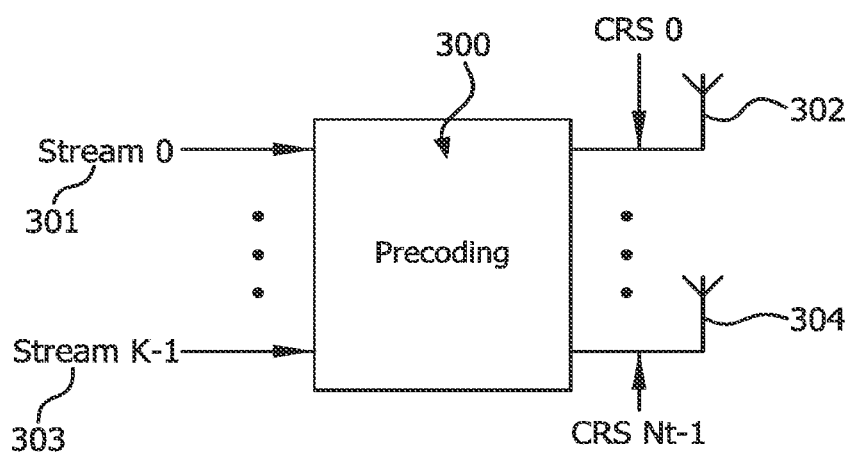
FIG. 3 is a diagram of a non-precoded cell-specific reference signal (RS)

FIG. 3 is an example of a non-precoded cell-specific RS. FIG. 3 includes a precoding entity 300. Stream 0 301 enters the precoding entity 300 and exits with a CRS 0 302. Stream k-1 303 enters the precoding entity 300 and exits with a CRS Nt-1 304.

FIG. 3 shows an example of a multiple input multiple output (MIMO) transmitter for non-precoded CRS transmission. In some cases, a WTRU transparent antenna virtualization may be used if the number of physical antenna elements and logical antenna port is different. The RS sequences may be transmitted on all antenna ports irrespective of the number of streams.

Figure 4:
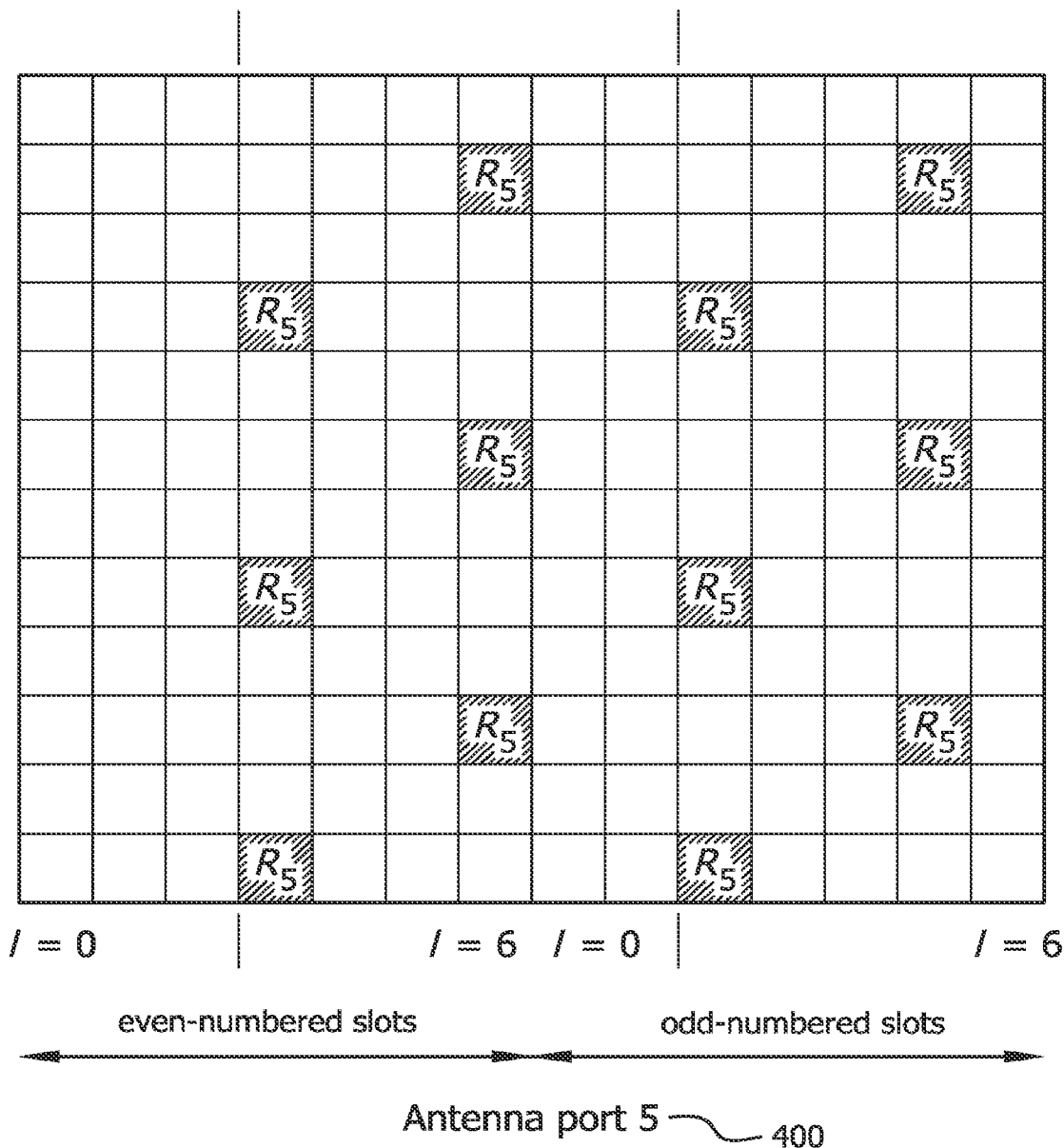
FIG. 4 is a diagram of a WTRU-specific DM-RS for a normal cyclic prefix (CP)

FIG. 4 is an example of a WTRU-specific DM-RS for a normal CP (port-5). FIG. 4 shows a DM-RS (antenna port-5 400) defined in an LTE system to support non-codebook based transmission at an evolved Node B (eNB) and the antenna port-5 400 only supports one layer transmission. Since the antenna port-5 400 is always transmitted with CRS, the RS overhead in total may increase significantly.

Figure 5:
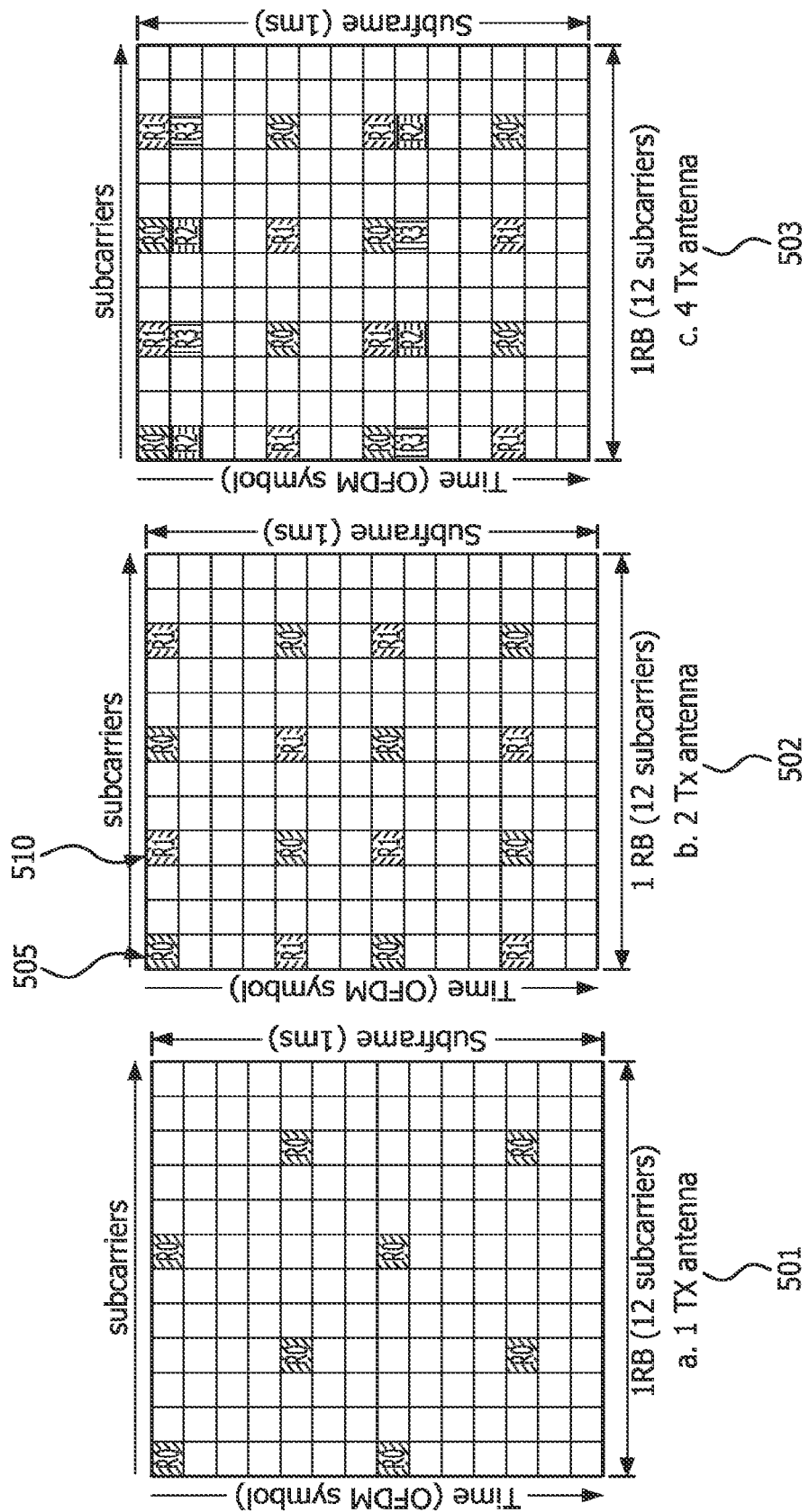
FIG. 5 is a diagram of a cell-specific reference signal (CRS) structure according to the number of antenna ports.

FIG. 5 is an example of a CRS structure according to the number of antenna ports. FIG. 5 shows the CRS pattern for 1Tx 501, 2Tx 502, and 4Tx 503 antenna ports for a normal cyclic prefix (CP). The CRS patterns for each antenna ports may be mutually orthogonal in the time/frequency domain. In FIGS. 5, R0 and R1 (for example, 505 and 510, respectively in the 2Tx 502 antenna port) indicate CRS for antenna port 0 and antenna port 1, respectively. To avoid interference between CRS antenna ports, the data resource elements (REs) located at the RE in which any CRS antenna ports is transmitted may be muted.

A predefined RS sequence (for example, Pseudo-random noise (PN) sequence and the like) may be transmitted in the RE location for the CRS ports to minimize inter-cell interference, thus improving channel estimation accuracy from CRS. This PN sequence may be applied at the OFDM symbol level in a subframe and the sequence may be defined according to the cell-ID, subframe number and the position of the OFDM symbol. For instance, the number of CRS antenna ports may be two in an OFDM symbol containing CRS per physical resource block (PRB) and the number of PRBs in an LTE system may vary from 6 to 110. In this case, the total number of CRS for an antenna port in an OFDM symbol containing the RS may be $2 \times N_{RB}$, which may imply that the sequence length should be $2 \times N$. Here, $N_{RB}$ denotes the number of RBs corresponding to a bandwidth and the sequence may be binary or complex. The sequence r(m) shows the complex sequence.

$$r(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 2N_{RB}^{DL} - 1$$

Equation 1 where $N_{RB}^{DL}$ denotes the number of RB corresponding to the maximum bandwidth in the LTE system, therefore $N_{RB}^{DL}$ may be 110 as mentioned above. c denotes a PN sequence with length-31 and may be defined with Gold-sequence. If a DM-RS is configured, the following equation may be used:

$$r(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 12N_{RB}^{PDSCH} - 1$$

Equation 2 where $N_{RB}^{PDSCH}$ denotes the number of RBs allocated for a specific WTRU. Therefore the sequence length may vary according to the number of RBs allocated for a WTRU.

To reduce the overall RS overhead, a DM-RS based downlink transmission may be introduced in the Release 10 LTE-A system. The CRS may be a non-precoded RS which is common for all WTRUs in a cell, therefore the RS sequences for all antenna ports may need to be transmission always. On the other hand, the DM-RS may be a WTRU-specific precoded RS and the same precoder used for PDSCH may be used for the DM-RS. In this case, the RS sequences may be transmitted only on the antenna ports used for PDSCH transmission, thus reducing RS overhead as compared with CRS since the used number of antenna ports may be smaller than or equal to the number of antenna ports used for CRS according to the number of layers for the PDSCH transmission.

Figure 6:
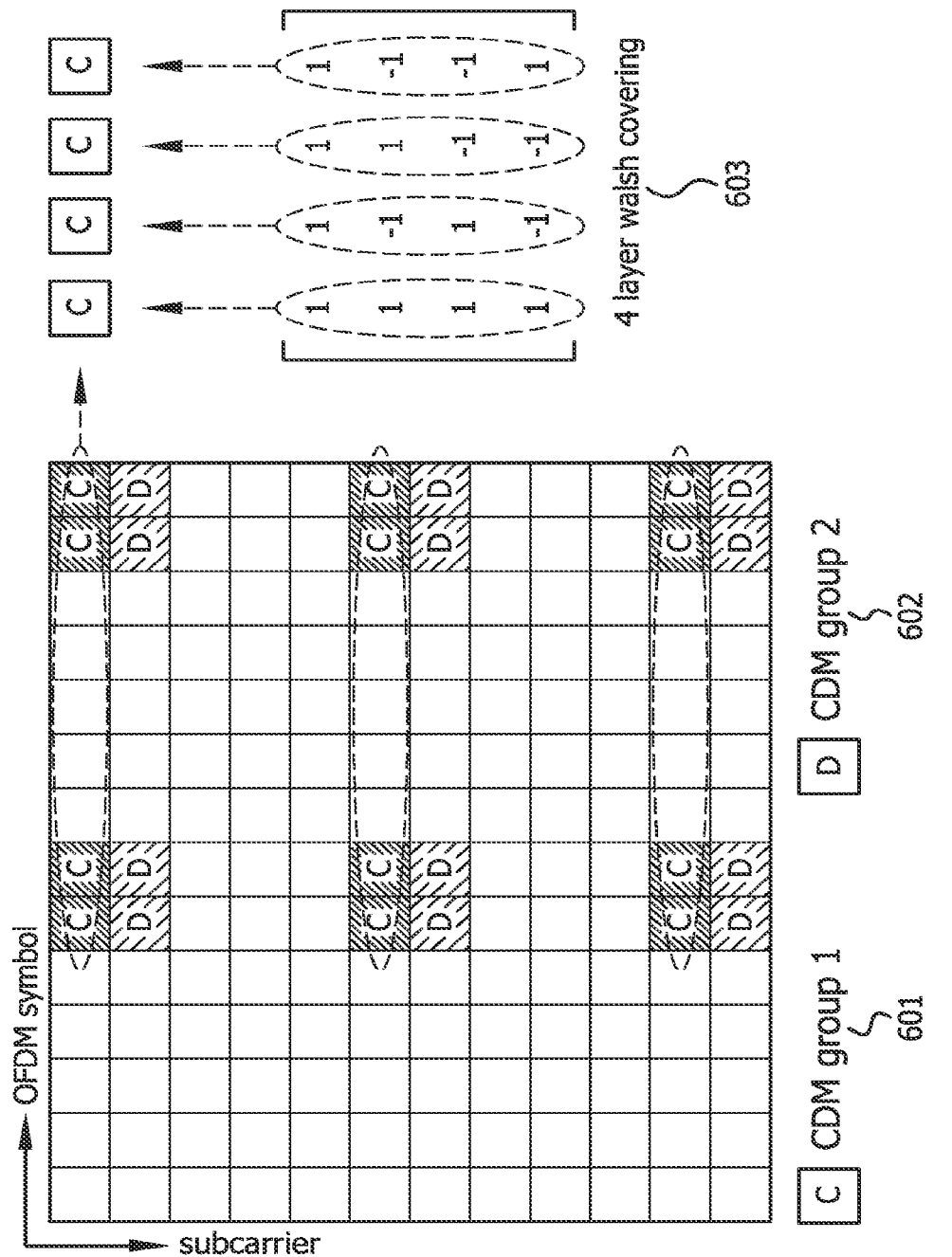
FIG. 6 is a diagram of a DM-RS pattern supporting up to eight layers.

FIG. 6 is an example of a DM-RS pattern supporting up to 8 layers. FIG. 6 shows the DM-RS patterns in a PRB for a subframe with a normal CP as an example. FIG. 6 includes two code division multiplexing (CDM) groups, CDM group 1 601 and CDM group 2 602. Also illustrated in FIG. 6 is the 4 layer Walsh covering 603 which may be used for CDM multiplexing for each CDM group. CDM groups may be used for multiplexing up to 4 layers in each CDM group. Therefore, up to 8 layers may be multiplexed as a maximum in this pattern. For the CDM multiplexing for each CDM group, 4×4 Walsh spreading may be used.

Since the DM-RS is only used for demodulation performance, a time/frequency sparse CSI-RS may be introduced for measurement purposes. The CSI-RS may be transmitted with a duty cycle {5, 10, 20, 40, 80} ms in the physical downlink shared channel (PDSCH) region. In addition, up to 20 CSI-RS pattern reuse may be available in a subframe as shown in FIG. 7.

Figure 7:
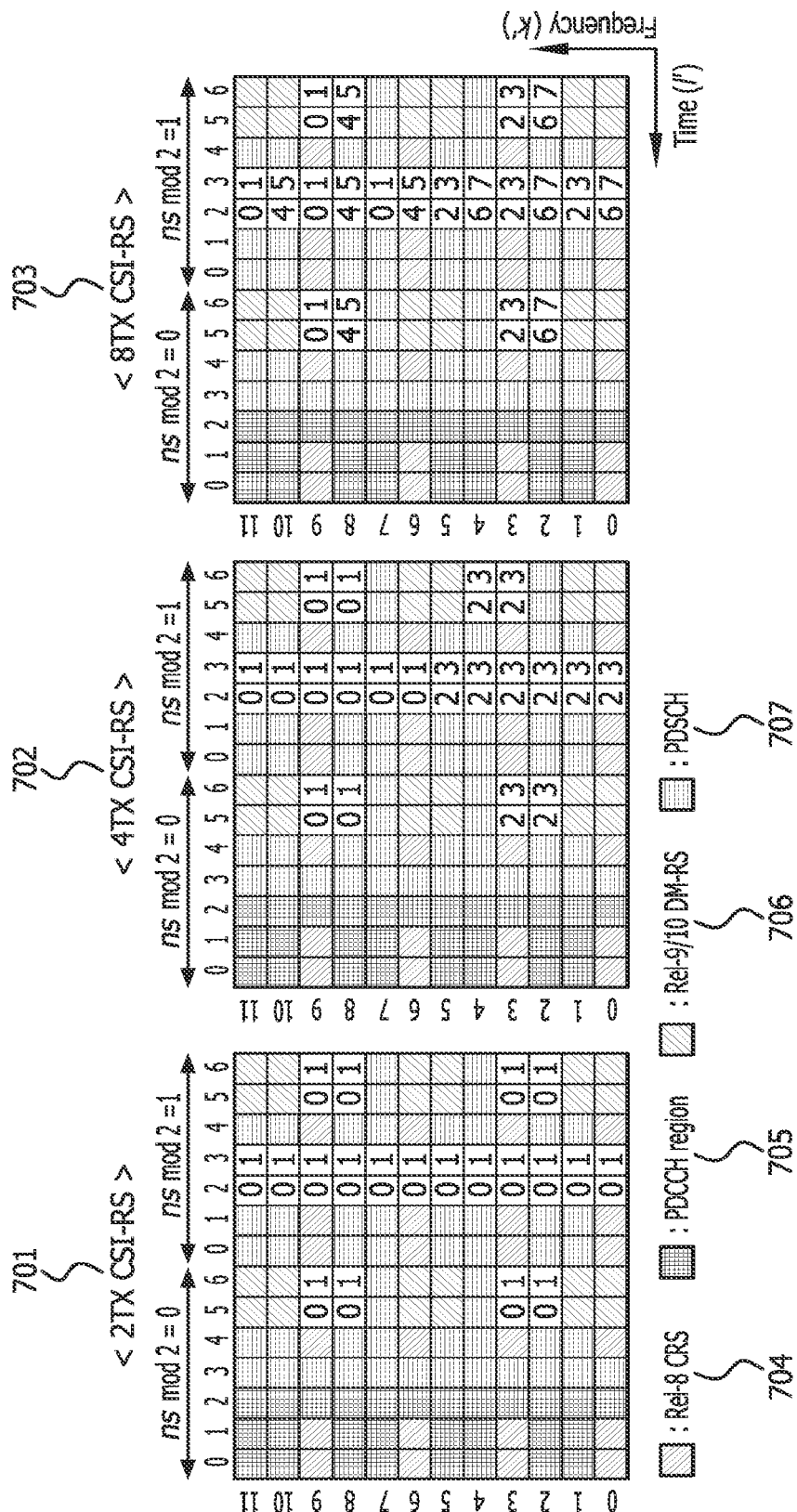
FIG. 7 is a diagram of a channel state information reference signal (CSI-RS) patterns reuse according to the number of ports.

FIG. 7 is an example of CSI-RS patterns reuse according to the number of ports. FIG. 7 shows the CSI-RS patters for 2Tx 701, 4Tx, 702, and 8Tx 703 antenna ports. In FIG. 7, the same shading implies a set of REs for a particular CSI-RS configuration. The different shaded regions represent Rel-8 CRS 703, a Physical Downlink Control Channel (PDCCH) region 705; Rel 9/10 DM-RS 706, and a Physical Downlink Shared Channel 707.

Two types of reporting channels may be used, such as the physical uplink control channel (PUCCH) and the physical uplink shared channel (PUSCH). The PUCCH reporting channel may provide robust CSI feedback while allowing limited feedback overhead. The PUSCH reporting channel may allow a large amount of feedback overhead with less reliability. Therefore, the PUCCH reporting channel may be used for periodic CSI feedback for coarse link adaptation and the PUSCH reporting may be triggered aperiocally for finer link adaptation.

Table 1 is an example of reporting modes in LTE/LTE-A.

TABLE 1

Reporting modes in LTE/LTE-A

| Scheduling Mode | Periodic CSI reporting channels | Aperiodic CSI reporting channel |
|---|---|---|
| Frequency non-selective | PUCCH | |
| Frequency selective | PUCCH | PUSCH |

CSI feedback may be reported in the format of a rank indicator (RI), precoder matrix index (PMI) and channel quality indicator (CQI). The RI and PMI may be calculated at a WTRU receiver by selecting the rank and the precoding matrix in the predefined codebook which maximizes WTRU throughput. The PMI and CQI may be further classified into wideband, subband, and WTRU-selected subband, while RI is only reported in a wideband manner.

Table 2 shows further details aperiodic and periodic for CSI feedback according to the transmission mode.

TABLE 2

Rel-8/Rel-9 Details of CSI feedback according to Transmission Modes

| Transmission Mode | Aperiodic Feedback | Periodic Feedback |
|---|---|---|
| 1 | Mode 2-0: WTRU selected sub band CQI: WB CQI + CQI over M best subbands. | Mode 1-0: WB CQI |
| 2 | | Mode 2-0: WTRU Selected sub band CQI: WB CQI + WTRU reports CQI in preferred subband in each BW part, one BW part in each reporting opportunity. Notes: CQI for first CW only, No PMI |
| 3 | | |
| 7 | | |
| 8 | Mode 3-0: high layer(HL) configured subband CQI: WB CQI + subband CQI. Notes: CQI for first CW only, No PMI | |
| 4 | Mode 1-2: WB CQI/ Multiple PMI: CQI for each CW; PMI for each subband. | Mode 1-1: WB CQI/ Single PMI |
| 6 | | |
| 8 | | Mode 2-1: WTRU selected subband CQI/Single PMI ($N_{RB}^{DL} > 7$ only): WB CQI/PMI + WTRU reports CQI in preferred subband in each BW part |
| 5 | Mode 2-2: WTRU selected sub band CQI/Multiple PMI: CQI per CW and PMI, both over full BW and M best subbands. Mode 3-1: HL configured sub band CQI/Single PMI: WB CQI + subband CQI, both per CW. Mode 3-1: HL configured sub band CQI/Single PMI (see above) | |

Periodic feedback may be transmitted on the PUCCH, although it may be transmitted on the PUSCH when that channel exists. Periodic reporting may use a sequence of different types of reports; which may be defined as: Type 1: Subband CQI; Type 2: Wideband CQI/PMI; Type 3: RI; and Type 4: Wideband CQI.

Figure 8:
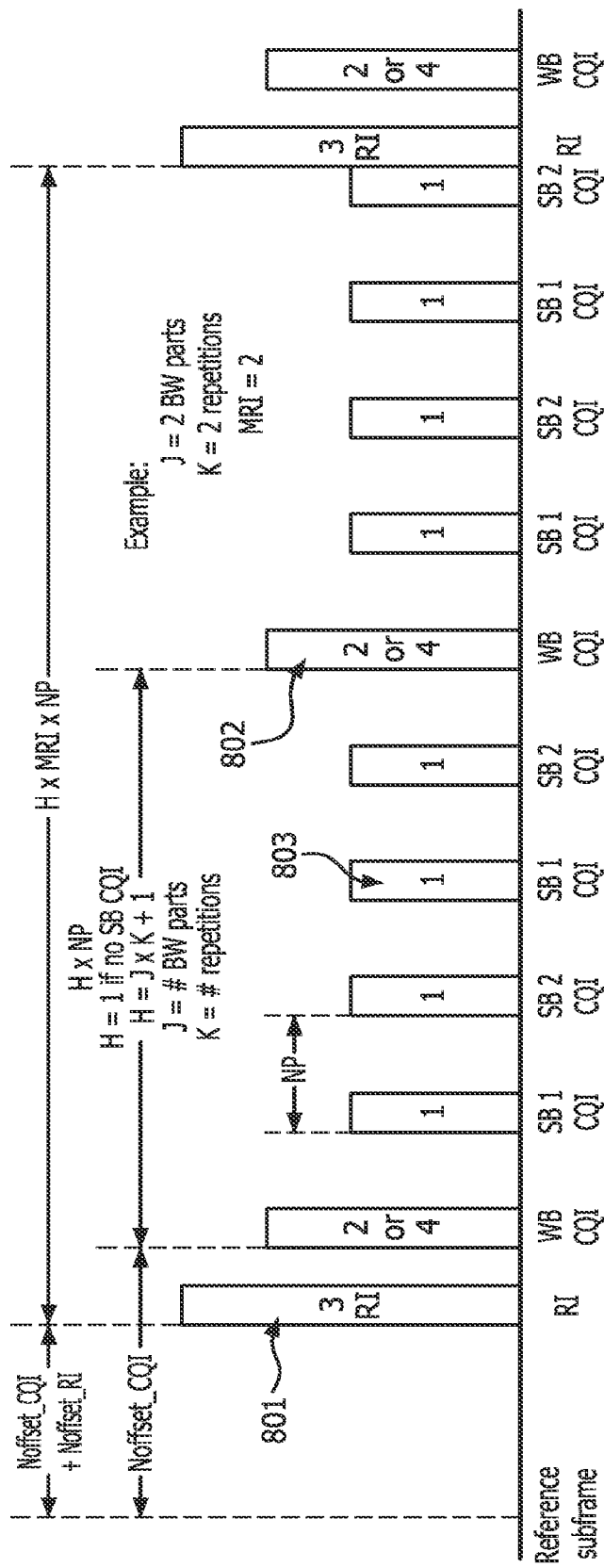
FIG. 8 is a timing diagram of an example of periodic reporting.

FIG. 8 is an example of periodic reporting. A typical reporting sequence is shown in FIG. 8, where the number in each rectangle corresponds to the report type above. The type 3 RI may be reported with longest duty cycle which is defined as H×MRI×NP subframes where H, MRI, and NP are configured by higher layers. The type 2 802 wideband CQI/PMI may be reported with a longer duty cycle over type 1 803 subband CQI since subband CQI is changed more frequently over time due to its short-term channel characteristic.

Aperiodic feedback may be requested by DCI Format 0 or DCI format 4 when the CQI Request bit is set. It may be transmitted on the PUSCH.

In LTE Rel-10, the types of periodic PUCCH feedback may be further extended to the following for eight transmit antenna ports: Type 1 report supports CQI feedback for the WTRU selected sub-bands; Type 1a report supports subband CQI and second PMI feedback; Type 2, Type 2b, and Type 2c reports support wideband CQI and PMI feedback; Type 2a report supports wideband PMI feedback; Type 3 report supports RI feedback; Type 4 report supports wideband CQI; Type 5 report supports RI and wideband PMI feedback; and Type 6 report supports RI and PTI feedback.

In a Type 6 report, the precoding type indicator (PTI) may be used only for 8 transmit antenna ports since the 8-transmit precoder is defined with a dual codebook.

Figure 9:
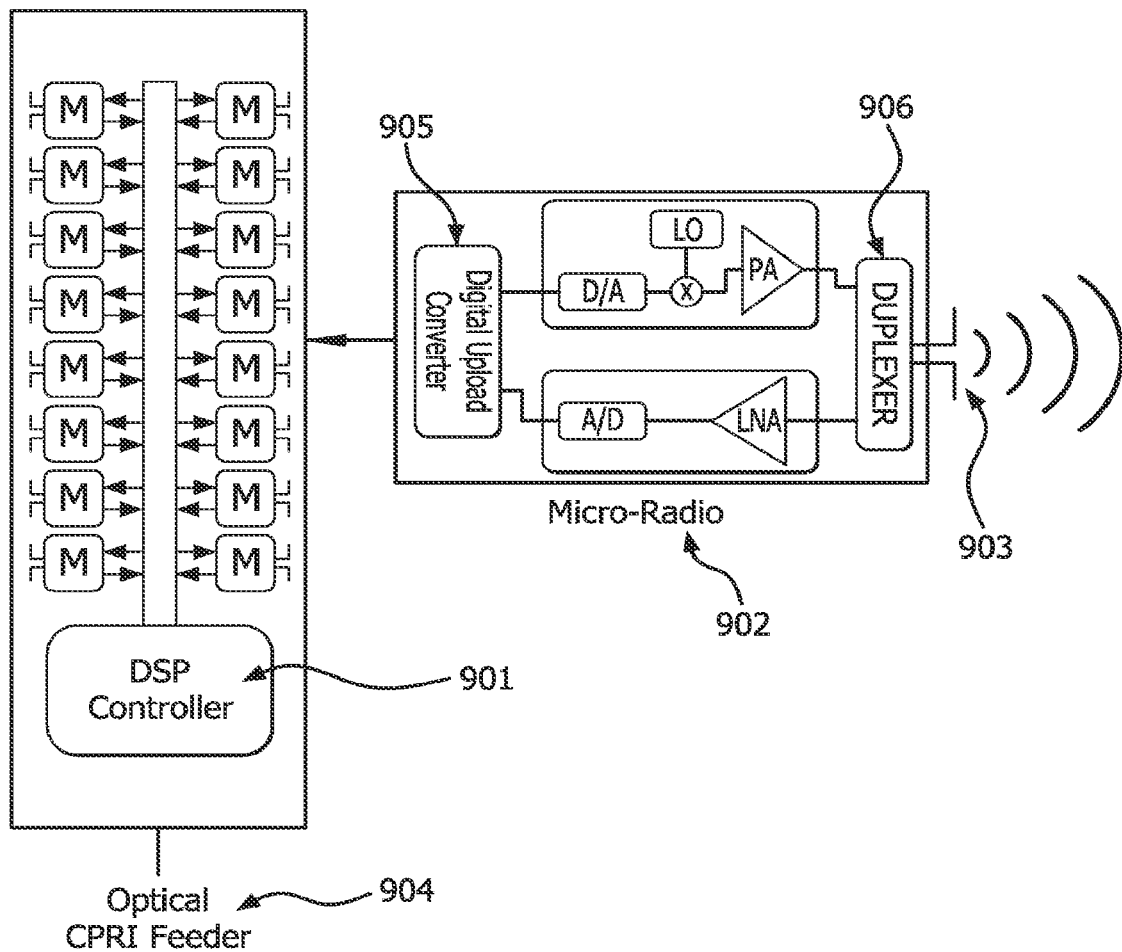
FIG. 9 is a block diagram of a an active antenna system (AAS) radio architecture.

An active antenna system (AAS) may be a signal processing controlled smart antenna system. FIG. 9 is a generic block diagram of AAS radio architecture. As shown in FIG. 9, an AAS system consists of three components, namely a digital signal processing (DSP) controller 901 (also called beam controller), an active transceiver micro-radio unit 902, and a passive antenna element. The DSP controller 901 is part of the optical CPRI feeder 904. The active transceiver micro-radio unit 902 includes a digital upload converter 905 and a duplexer 906. Through the DSP controller units, both the amplitude and phase of the RF signal fed into each antenna may be dynamically adjusted to change the beam direction and width.

Figure 10:
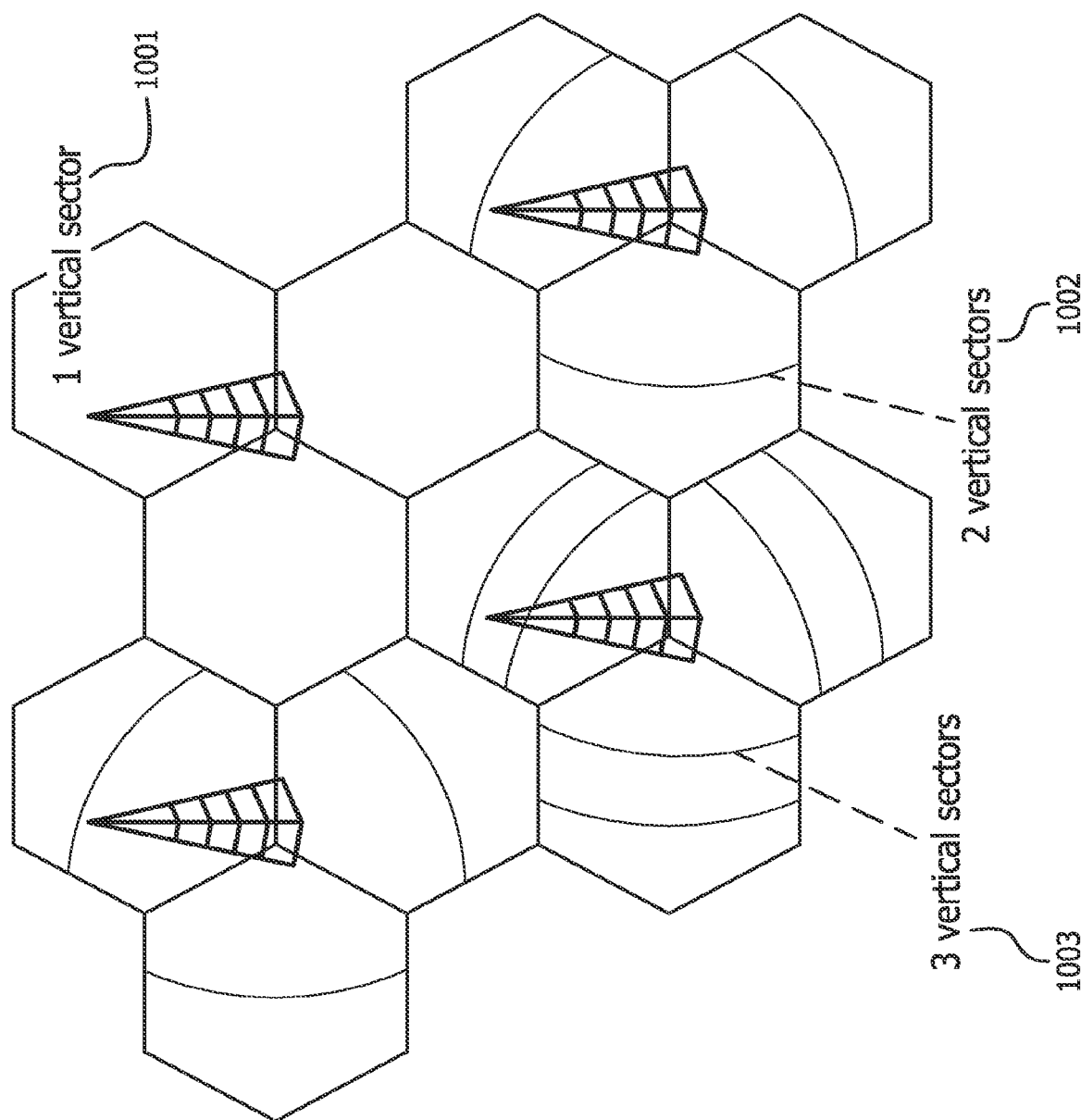
FIG. 10 is a diagram of vertical sectorization with the AAS radio architecture.

FIG. 10 is an example concept of vertical sectorization with AAS radio architecture. FIG. 10 shows examples of 1 vertical sector 1001, 2 vertical sectors 1002, and 3 vertical sectors 1003. The AAS may be used to form multiple vertical sectors within a cell as shown in FIG. 10, resulting in cell-splitting gain in spatial domain. The vertical sectors may be used in either a cell-specific manner or WTRU-specific manner. The vertical sectors using AAS may reduce inter-cell interference while improving throughput performance.

Figure 11:
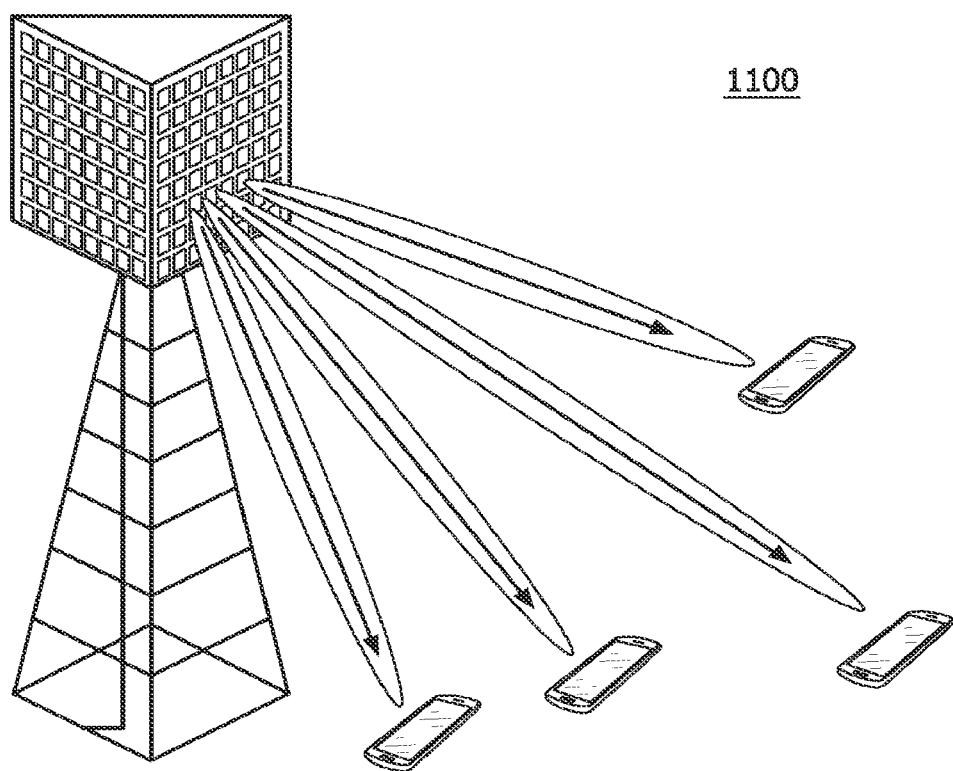
FIG. 11 is a diagram of WTRU-specific elevation beamforming using AAS.

FIG. 11 is an example of a WTRU specific elevation beamforming using AAS. In addition to the vertical sectorization, the AAS 1100 may provide WTRU-specific elevation beamforming gain by using the best elevation beam for a specific WTRU as shown in FIG. 11. From the WTRU-specific elevation beamforming, the cell coverage or WTRU throughput performance may be significantly improved.

In LTE, the Random Access (RA) procedure may be used in certain situations, for example, one or more of the following: 1.) For an RRC Connection Request, such as for initial access or to register; 2.) For RRC Connection re-establishment, such as following radio link failure; 3.) During the Handover to access the target cell; 4.) To obtain uplink (UL) synchronization, such as when UL synchronization is lost and downlink (DL) data arrives or there is UL data to transmit; 5.) When the WTRU has UL data to transmit and there are no dedicated resources (for example, no PUCCH resources have been assigned to the WTRU); and 6.) For positioning purposes, such as when a timing advance is needed for WTRU positioning.

There may be two forms of the RA procedure: Contention-based (which may also be called common), which may apply to the first five events above, and non-contention based (which may also be called contention free or dedicated), which may apply or only apply to handover, DL data arrival, and positioning.

When using a contention-based RA procedure, the WTRU may initiate the process by transmitting a RA preamble randomly chosen from a common pool of preambles which may be communicated to the WTRU by the network, for example, via broadcasted system information. The WTRU may transmit the preamble on a PRACH resource (for example, a resource in time and frequency) that the WTRU chooses from a set of allowed resources, which may be communicated to the WTRU by the network, for example, via broadcasted system information. This set of allowed PRACH resources may be referred to as the cell's configured set of PRACH resources. The unit of time for the PRACH resource may be a subframe. The subframe the WTRU chooses for the PRACH resource may be the next subframe configured for PRACH in which the WTRU may transmit the PRACH (for example, based on timing, measurement, and other WTRU constraints). The frequency aspect of the PRACH resource (for example, the resource blocks (RBs)) the WTRU chooses in the selected subframe may be based on parameters communicated to the WTRU by the network, for example, via broadcasted system information. In certain cases, for example, for frequency division duplex (FDD), there may be one frequency resource allowed for PRACH in any subframe. The frequency resource may be defined by a starting (lowest) RB number which may be provided by the network, for example, prach-FrequencyOffset, and may have a fixed bandwidth, such as 6 RBs.

When a contention-based RA procedure is used, it may be possible that at least two WTRUs select the same resources (preamble and PRACH resource) for random access, and therefore the contention situation may need to be resolved.

When using a non-contention based RA procedure, the WTRU may transmit a RA preamble explicitly signaled to the WTRU by the network, for example, ra-PreambleIndex. The WTRU may transmit the preamble on a PRACH resource chosen from a specific subset of the cell's configured PRACH resources. The subset (for example, the mask) may be explicitly signaled to the WTRU by the network, for example, ra-PRACH-MaskIndex. In the case the subset includes only one choice, the WTRU may use the indicated resource.

In some cases which may be applicable to one or both of the RA procedure types, the preamble transmission may span or be repeated over more than one subframe. In this case, the selected subframe may be the starting subframe for the transmission.

The terms RACH resources and PRACH resources may be used interchangeably.

Figure 12:
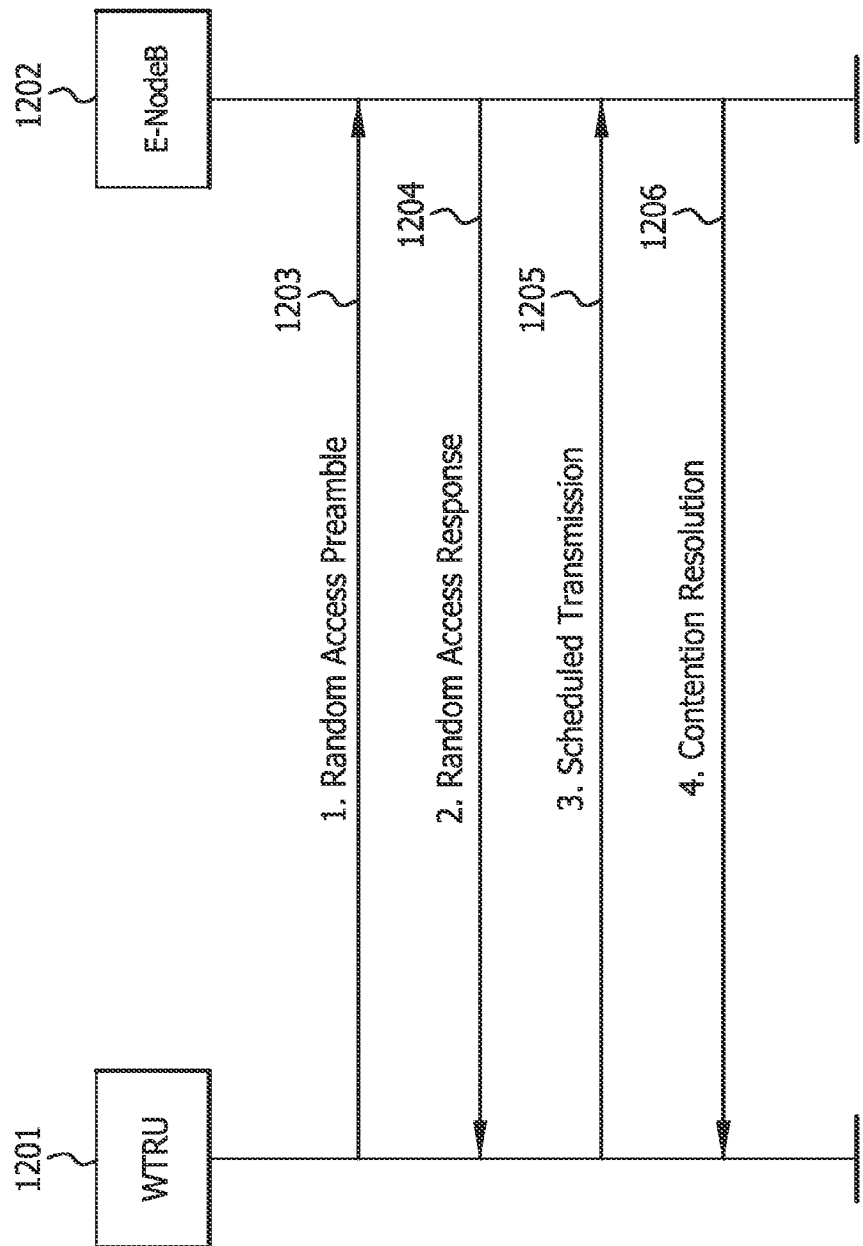
FIG. 12 is a diagram of a contention-based random access procedure.

FIG. 12 is an example of a contention-based RA procedure. The steps of the contention-based RA procedure may be as follows.

The WTRU 1201 may transmit 1203 the selected RA preamble on the selected PRACH resource to an eNB 1202. After transmitting the preamble, the WTRU 1201 may read the physical downlink control channel (PDCCH) and look for the Random Access Radio Network Temporary ID (RA-RNTI) corresponding to the first subframe on which it transmitted the preamble. If it is not received in the response monitoring window, the WTRU 1201 may ramp up the power, select another resource (possibly after some backoff time), and try again. The RA-RNTI may be determined according to: RA-RNTI=1+t_id+10×f_id, where t_id may be the index of the first subframe of the PRACH used for preamble transmission (for example, 0≤t_id<10), and f_id may be the index of the PRACH used for preamble transmission within that subframe, in ascending order of frequency domain (for example, 0≤f_id<6). For the case of one frequency resource per subframe, for example, for FDD, f_id may be 0.

Random Access Response (RAR) 1204 may consist of a network, for example the eNB 1202, transmitting a timing advance command to adjust the terminal transmit timing to the WTRU 1201. The network 1202 may also allocate uplink resources for the WTRU 1201 and may transmit a response on the downlink control channel (PDCCH) using the RA-RNTI to identify which WTRU group the allocation is for. Within each group, the RA preamble identifier (RAPID) may be used to narrow down further (for example, at the medium access control (MAC) level) the WTRU group specified by the RA-RNTI to the subset of WTRUs which have used the same preamble during step 1 of the RA procedure. The RAR 1204 may include one or more of the index of the RA preamble sequences the network 1202 detected and for which the response is valid, the timing correction calculated by the RA preamble receiver, a scheduling grant, or a temporary cell identity (TC-RNTI).

For scheduled transmission 1205, the WTRU 1201 may use the allocated resources indicated by the scheduling grant to transmit 1205 its message (such as RRC Connection Request) to the eNB 1202. If the terminal is connected to a known cell (for example, in the RRC_CONNECTED state), the terminal may have a C-RNTI (Cell RNTI) which it may include in the UL message. Otherwise a core network terminal identifier may be used. The UL transmission (UL SCH) may be scrambled by the WTRU 1201 using the temporary TC-RNTI received in the RAR 1204. The scheduled transmission 1205 may be referred to as Message 3 (Msg3).

For contention resolution 1206, the network (eNodeB) 1202 may transmit 1206 a contention resolution message on the DL based either on the C-RNTI on the PDCCH or a WTRU contention resolution identity on the DL-SCH, for example, the core network terminal identifier transmitted by the terminal in the scheduled transmission 1205, to the WTRU 1201. Only the terminal which observes a match between the identity received in the contention resolution 1206 and the identity transmitted as part of the scheduled transmission 1205 may declare the RA procedure successful. Contention between WTRUs that chose both the same PRACH time-frequency resource and the same preamble may be resolved by the contention resolution 1206.

For contention-based RA, the WTRU may derive the common pool of preambles from parameters provided by the network. From these parameters, the WTRU may derive a full set of preambles, for example, a certain number such as 64 preambles, which may be based on one or more root Zadoff-Chu sequences. A parameter which may designate the sequence or sequences to use may be rootSequenceIndex. The WTRU may receive additional parameters indicating a subset of the preambles which may be used by the WTRU and how to divide this subset into two groups, A and B. For example, numberOfRA-Preambles may define the subset of preambles. The first sizeOfRA-PreamblesGroupA may be in Group A (for example, preambles 0 to sizeOfRA-PreamblesGroupA-1), and the remaining preambles in the subset, if any (for example, sizeOfRA-PreamblesGroupA to numberOfRA-Preambles-1), may be in Group B. When to use a Group A versus a Group B preamble may be known to the WTRU. The decision may be based on criteria such as the size of Msg3 and/or pathloss. Preambles in the full set which are not in Group A or B may be used by the network when it assigns dedicated preambles.

A PRACH Configuration Index, for example, prach-ConfigIndex, may be used by the network to tell the WTRU which of a preset list of possible configurations it is choosing for the cell's configured set of PRACH resources. The preset configurations may define, for example for FDD, one or more of the preamble formats, which may define the time for the preamble cyclic prefix (CP) and the time for the preamble sequence, the system frame numbers (SFNs) in which the PRACH is allowed (for example, any, even only, odd only), and the subframes of the allowed SFNs (for example, a specific 1, 2, 3, 4, 5, or all 10 subframes) in which the PRACH is allowed.

A Power Headroom Report (PHR) may be triggered by a WTRU if any of the following events occur.

A PHR may be triggered if a prohibitPHR-Timer expires or has expired and the path loss has changed more than dl-PathlossChange dB for at least one activated Serving Cell which is used as a pathloss reference since the last transmission of a PHR when the WTRU has UL resources for new transmission.

A PHR may be triggered if a periodicPHR-Timer expires.

A PHR may be triggered upon configuration or reconfiguration of the power headroom reporting functionality by upper layers, which is not used to disable the function.

A PHR may be triggered upon activation of a serving cell (SCell) with configured UL.

A PHR may be triggered if: 1) a prohibitPHR-Timer expires or has expired, 2) when the WTRU has UL resources for new transmission, and 3) when the following in this transmission time interval (TTI) for any of the active SCells with configured UL is true: there are UL resources allocated for transmission or there is a PUCCH transmission on this cell, and the required power backoff due to power management (as allowed by P-MPR$_c$) for this cell has changed more than dl-Pathloss Change dB since the last transmission of a PHR when the WTRU had UL resources allocated for transmission or PUCCH transmission on this cell.

A PHR may be transmitted by a WTRU in a particular TTI (which may correspond to a particular subframe) if the WTRU has UL resources allocated for new transmission for this TTI (or subframe) and the following applies: the Power Headroom reporting procedure determines that at least one PHR has been triggered and not cancelled, and the allocated UL resources may accommodate a PHR MAC control element plus its subheader if extendedPHR is not configured; or the Extended PHR MAC control element plus its subheader if extendedPHR is configured, as a result of logical channel prioritization.

A WTRU may transmit a sounding reference signal (SRS) to the eNB when configured or triggered to do so. The WTRU may transmit SRS in the last symbol of a subframe.

SRS transmission by a WTRU may be periodic or aperiodic. Periodic SRS transmission may be configured by the eNB. Aperiodic SRS transmissions may be triggered by the eNB, for example, by including a request for aperiodic SRS along with an UL grant.

Cell-specific SRS subframes may be subframes in which the SRS may be transmitted in a given cell. The configuration of cell-specific subframes may be provided in signaling such as broadcast or dedicated radio resource control (RRC) signaling.

WTRU-specific SRS subframes may be subframes in which the SRS may be transmitted by a certain WTRU, which may be a subset of the cell-specific SRS subframes. The configuration of WTRU-specific subframes may be provided to a WTRU in signaling, such as dedicated RRC signaling. There may be separate WTRU-specific subframes configured for a WTRU for periodic and aperiodic SRS.

When aperiodic SRS is triggered in subframe n, the WTRU may transmit the SRS in the next aperiodic WTRU-specific SRS subframe n+k, where k satisfies a certain criteria, for example, k>=4.

When one SRS (periodic or aperiodic SRS) and another SRS or channel are both scheduled to be transmitted in the same subframe, rules and/or configuration parameters may govern whether or not the WTRU may transmit the scheduled SRS.

The aperiodic SRS trigger and the aperiodic SRS request may be used interchangeably.

The eNB receiver may estimate a proper downlink vertical beam (for example, transmit vertical beam) for a specific WTRU based on the uplink vertical beam (for example, receive vertical beam), thus requiring a SRS for the receive vertical beam convergence. Since the UL coverage may be different, more than 6 dB between before and after the receive vertical beam adjustment. Therefore, faster receive vertical convergence may reduce interference and increase UL throughput. However, current SRS design may not allow the faster receive vertical beam convergence, as its transmission has a duty cycle and/or a single subframe transmission is only possible at a time.

To allow efficient vertical beam adjustment, a WTRU reporting assisted vertical beam selection may be used at the eNB. Since the vertical antenna elements may not be seen by the WTRU, multiple DL reference signals may be used for a WTRU to select the best vertical beam associated with a specific reference signal. However, current DL reference signal structure may not allow multiple DL reference signals or the overhead of multiple DL reference signals may be excessive.

Since the SRS transmission is only available after initial cell access, the PRACH process may not enjoy the benefit of the active antenna system (AAS). In addition, the UL coverage of the PRACH may be worse than before, as the appropriate UL vertical beam for a specific WTRU may not be estimated at the eNB receiver. Therefore, the PRACH may not have enough coverage in an AAS as compared with other UL/DL channels.

For the RA procedure, such as the initial RA procedure, to gain initial access or transmit the RRC Connection request, it may be desirable to improve performance by using vertical beamforming. Methods and procedures may be needed to enable the WTRU to determine a vertical beam for transmission and for the eNB to know what vertical beam to use for reception.

After receive beam convergence, the power headroom reporting may be updated immediately since there may be more than a 6 dB difference between before and after the receive beam convergence. Current power headroom reporting behavior may not support this case. It may be useful for the eNB to receive a PHR for a WTRU as soon as possible after the vertical beam it has selected for the WTRU has converged. Methods and procedures may be needed to accomplish this.

Since a WTRU moves in a cell across multiple vertical sectors/beams, the best vertical beam for the WTRU may be changed frequently over time. To provide appropriate coverage in vertical sectorized cell, WTRU mobility may be taken into account even within a cell. Current LTE/LTE-A systems may not be flexible to support WTRU mobility across multiple vertical beams within a cell.

A new UL reference signal may be defined for better receive beam convergence and the reference signal may be similar to the sounding reference signal (SRS). The UL reference signal for receive beam convergence may be defined as the Uplink Beam Tracking Reference Signal (u-BTRS).

In a first example, the u-BTRS may be defined in a PUSCH region only, where the PUSCH region implies that the PRBs are not used for the PUCCH in a subframe. In this case, one or more of following may apply.

The u-BTRS may be transmitted in the subframe configured for cell-specific u-BTRS subframe and the last single carrier frequency division multiple access (SC-FDMA) symbol, as for SRS. In an example, the cell-specific u-BTRS subframes may be equivalent to the cell-specific SRS subframe. In another example, the cell-specific u-BTRS subframes may be independently configured and the subframes may be mutually exclusive from the cell-specific SRS subframes. Alternatively, the cell-specific u-BTRS subframes may be independently configured from cell-specific SRS subframes while subframes may fully or partially be overlapped between u-BTRS and SRS. In the case of overlapping, at least one of following may be applied: the u-BTRS transmission has a higher priority, so that all SRS transmissions in the subframes may be dropped; the SRS transmission has a higher priority, so that all u-BTRS transmissions in the subframes may be dropped; and the subframe may be used either for u-BTRS transmission or for SRS transmission. If both transmissions are triggered and/or scheduled in the subframe, the u-BTRS may have a higher priority and SRS may be dropped, or vice versa.

The u-BTRS may be transmitted in the subframe configured for cell-specific u-BTRS subframe (other than the last SC-FDMA symbol), thus allowing multiplexing of u-BTRS and SRS in the same subframe if scheduled. In this case, one or more of following may apply: the second to last SC-FDMA symbol may be used for the u-BTRS subframe; one of SC-FDMA symbols used for DM-RS may be used for the u-BTRS transmission; the last SC-FDMA symbol in the first slot may be used for the u-BTRS transmission in the subframe; and a SC-FDMA symbol for u-BTRS may be configured by a broadcasting channel (for example, SIB-x).

In a cell-specific u-BTRS subframe, even though SRS may be transmitted in all system bandwidth, the u-BTRS may only be transmitted in the PUSCH region. Therefore, the frequency bandwidth for the u-BTRS in a subframe may be smaller than the SRS. For instance, if a system has 50 PRBs in UL the SRS may be transmitted in any location of the 50 PRBs according to the configuration. The u-BTRS may only be transmitted in the center $N_{PUSCH}$ PRBs for the PUSCH. In this case, at least one of following may be applied: $N_{PUSCH}$ and $N_{uBTRS}$ may be used interchangeably, where $N_{uBTRS}$ denotes the PRBs configured for u-BTRS transmission which may be defined irrespective of the PUSCH region; the $N_{PUSCH}$ may be configured by higher layers, for the indication of $N_{PUSCH}$, the starting PRB number may be indicated; and $N_{PUSCH}$ may be indicated dynamically in each trigger of u-BTRS.

In second example, multiple SC-FDMA symbols may be used for the u-BTRS in a subframe. If multiple SC-FDMA symbols are used for the u-BTRS transmission, the receive beam convergence time may be reduced. For u-BTRS transmission in multiple SC-FDMA symbols, one or more of following may apply.

The multiple SC-FDMA symbols in a subframe for u-BTRS transmission may be located within a center $N_{PUSCH}/N_{uBTRS}$ PRBs.

The last $N_{uBTRS}$ SC-FDMA symbols in a subframe may be used for u-BTRS transmission and at least one of following may be used. The $N_{uBTRS}$ may be defined as a predefined integer number. For example, $N_{uBTRS}=2$ or $N_{uBTRS}=3$ may be used. The $N_{uBTRS}$ may be configured by the eNB via a broadcasting channel (for example, MIB or SIB-x) or higher layer signaling.

Among the multiple SC-FDMA symbols for u-BTRS transmission, if one SC-FDMA symbol collides with the SC-FDMA symbol for SRS transmission, the colliding SC-FDMA symbol may not be used for the u-BTRS transmission in the subframe while the other SC-FDMA symbols may be used.

When multiple SC-FDMA symbols are used for the u-BTRS transmission, the u-BTRS in a SC-FDMA symbol may be repetitively transmitted in the other SC-FDMA symbols in the same frequency locations.

In a solution for PUSCH transmission, if a WTRU capable for u-BTRS transmission is scheduled for PUSCH transmission in the cell-specific u-BTRS subframe, at least one of following WTRU behaviors may apply. A WTRU may transmit the PUSCH and rate-match around the cell-specific u-BTRS resource in the subframe. A WTRU may transmit the PUSCH if the WTRU is not scheduled to transmit the u-BTRS in that subframe. Otherwise, the WTRU may drop the PUSCH and transmit the u-BTRS in that subframe. Alternatively, the WTRU may drop the u-BTRS transmission and transmit the PUSCH in that subframe.

A DL beam tracking reference signal (d-BTRS) may be defined for the purpose of vertical beam measurement so that a WTRU may measure multiple vertical beams from the d-BTRS associated with the vertical beams. Assuming that $N_{vertical}$ beams are used in a cell, $N_{vertical}$ d-BTRS may be configured so that one d-BTRS may correspond to one vertical beam. In an example, multiple CSI-RS may be used as d-BTRS for multiple vertical beam tracking. In this case, one or more of following may apply.

Multiple CSI-RS may be configured in a cell-specific manner and each CSI-RS may be associated with a vertical beam. To configure the cell-specific CSI-RS as d-BTRS, at least one of following may be used. Two or more CSI-RS configurations may be informed to a WTRU via a broadcasting channel (for example, MIB or SIB-x) and the CSI-RS configurations may include at least one of: number of antenna ports, duty cycle, pattern, or subframe offset. The number of antenna ports for each cell-specific CSI-RS configuration may be limited to one or two antenna ports, which may be independent from the WTRU-specific CSI-RS configuration. The cell-specific CSI-RS may be transmitted in a subset of PRBs. For instance, the cell-specific CSI-RS may be transmitted in even-numbered PRBs or odd-numbered PRBs. The subset of PRBs for the cell-specific CSI-RS may be informed to a WTRU as a part of CSI-RS configuration.

A vertical beam measurement reporting procedure may be defined based on the multiple cell-specific CSI-RS for better DL vertical beam tracking at the eNB transmitter. For the vertical beam measurement reporting procedure, WTRU behavior may be defined as at least one of the following. A WTRU may measure two or more cell-specific CSI-RS and measure the received signal to noise ratio (SNR) received signal to interference plus noise ratio (SINR), which may be considered as reference signal received power (RSRP), pathloss, wideband CQI, or subband CQI. A WTRU may report the measured received SINR for each cell-specific CSI-RS in a specific UL subframe if scheduled to report or triggered in the subframe.

An antenna port in a cell-specific CSI-RS may correspond to a specific vertical beam. A single cell-specific CSI-RS may be configured with two or more antenna ports and each antenna port may be associated with a specific vertical beam. A WTRU may measure the received SINR for each antenna port in the cell-specific CSI-RS and report the measured SINRs in a specific UL subframe if scheduled to report or triggered in the subframe.

In another example, a new measurement RS may be defined as d-BTRS for better measurement accuracy as compared with that of CSI-RS.

The new measurement RS (d-BTRS) may be defined with one or more of the following properties. A single antenna port may be defined with 3 or 6 subcarrier spacing. An orthogonal frequency division multiplexing (OFDM) symbol in a subframe may be used as a reference signal, resulting in 1 subcarrier spacing in the frequency domain. The CSI-RS patterns may be reused with modification.

Figure 13:
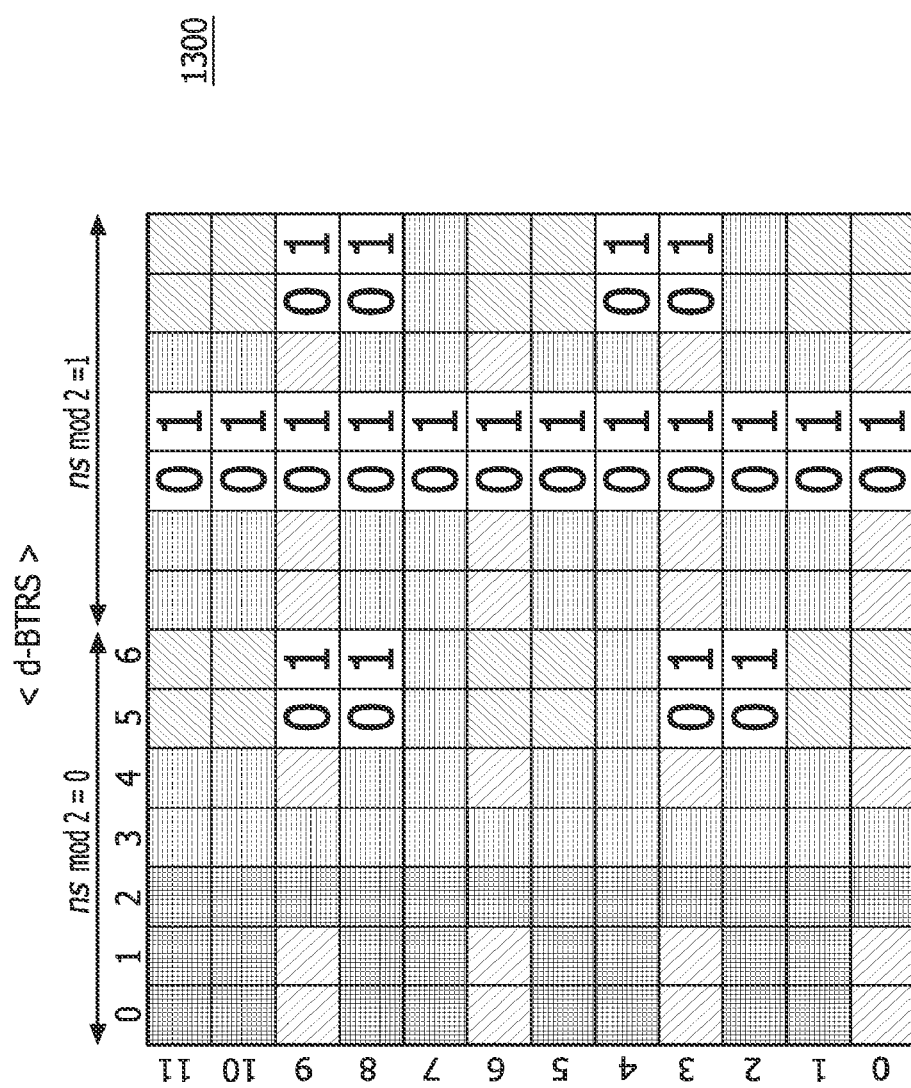
FIG. 13 is a diagram of a downlink beam tracking reference signal (d-BTRS) using a four port CSI-RS pattern.

FIG. 13 is an example of a downlink beam tracking reference signal (d-BTRS) using a four port CSI-RS pattern. For example, a 4-port CSI-RS pattern may be used as a 2-port d-BTRS pattern 1300 as shown in FIG. 13. Therefore, a larger port CSI-RS pattern may be used and modified for a smaller port d-BTRS pattern for a denser RS pattern in the frequency domain from an antenna port perspective that may include an 8-port CSI-RS pattern used for a 2-port d-BTRS pattern and a 2-port CSI-RS pattern used for a 1-port d-BTRS pattern. For example, by using a 4 port CSI-RS pattern for 2-port d-BTRS as shown in FIG. 13, the frequency spacing of an antenna port of d-BTRS is 6 subcarriers. However, if 2-port CSI-RS pattern is used for a 2-port d-BTRS, the frequency spacing of an antenna port of d-BTRS is 12 subcarriers.

Selection or determination of an RA resource may include selection/determination of one or more of an RA preamble, an RA preamble format, and a PRACH resource which may include the selection/determination of the time and/or frequency aspect (for example, allocation) of the resource. A WTRU may select or otherwise determine one or more RA resources based on at least one measurement.

The eNB may provide and the WTRU may receive one or more measurement configurations where each measurement configuration may correspond to a signal the eNB may transmit with one or more certain characteristics. For example, the signal may include a certain vertical (or DL vertical) beam.

In the descriptions herein, vertical and DL vertical beams are example characteristics. Any other characteristics may be used and still be consistent with this description.

The configuration may be signaled by the eNB to the WTRU via higher layer signaling such as broadcast or dedicated RRC signaling.

A measurement configuration may include the parameters needed by the WTRU to make the measurements, such as: the time schedule of the measurement (for example, which frames and subframes), frequency location, measurement identifier, the type of measurement, or other parameters specific to the type of measurement.

Separate from, or as part of, a measurement configuration, the eNB may indicate an association of a measurement (or measurement configuration), which may correspond to a certain transmission characteristic such as a vertical beam, with a certain set of RA resources or RA parameters.

The RA resources or RA parameters may include or may enable the WTRU to determine: a set of one or more RA preambles, the preamble format for the RA preambles, or a set of one or more PRACH resources which may include an allocation in frequency and/or time. This indication may be signaled by the eNB to the WTRU via higher layer signaling such as broadcast or dedicated RRC signaling.

The indication may include any parameters necessary to convey the certain set of RA parameters. For example, the parameters may include: one or more indices into one or more tables with predefined configurations which may, for example, define the frames and/or subframes to use; one or more masks to use with another configuration (or configurations) that define a larger set of resources; specific preamble number (or index); starting preamble number (or index); number of preambles; frequency offset for first RB; or Number of RBs.

Indication of association and/or random access or other related parameters may be provided for individual measurements (or measurement configurations) and/or groups of measurements (or measurement configurations).

A set of RA resources may currently be provided in a cell for contention-based RA. Since all WTRUs may use these resources and the eNB may not have certain information about these WTRUs, the eNB may not be able to treat reception of RA preambles from different WTRUs differently even if it may be desirable to do so.

One way to enable the eNB to recognize a certain purpose or characteristic of the WTRU transmitting a preamble may be to designate certain RA resources to be used by WTRUs for a certain purpose or with a certain characteristic. For example, the certain characteristic may be a preferred or selected beam direction. The eNB may designate certain RA resources, for example, certain RA preambles and/or PRACH resources, to be used by WTRUs that prefer or select a certain one or more vertical beam directions in the UL and/or DL. For reception of these preambles and/or resources, the eNB may use a specific UL vertical beam that may achieve better reception performance.

As another example, the certain characteristic may be that the WTRU has determined that a measurement it makes warrants use of a certain set of RA resources (for example, certain RA preambles and/or PRACH resources). For example, if a measurement a WTRU makes meets a certain criteria, the WTRU may choose and/or use an RA resource (for example, RA preamble and/or PRACH resource) in a set of RA resources (for example, RA preambles and/or PRACH resources) associated with that measurement or the configuration of the measurement.

A set of RA resources may be allocated by the eNB and/or used by a WTRU for RA transmission when the WTRU has a certain characteristic or purpose.

A set of RA resources associated with a certain characteristic or purpose may include a set of RA preambles and/or PRACH resources which may have one or more of the following aspects different from the RA preambles and PRACH resources designated in the cell for contention-based RA: preambles, time aspect (or allocation) of the PRACH resources, or frequency aspect (or allocation) of the PRACH resources.

When selecting RA resources, a WTRU with a certain purpose or characteristic may (or may only) choose an RA resource (for example, including preamble and PRACH resource in time and frequency) which is in the set of RA resources allowed or designated for use for the certain purpose or characteristic.

For the set of RA preambles which may be used for a certain purpose or characteristic, one or more of the following may apply.

The set of RA preambles may be a designated subset of the cell's existing full set of preambles. The set may be within the subset of the full set that is not part of Group A or Group B.

The set of RA preambles may be a separate set of preambles from the cell's existing full set of preambles. The set may have its own root Zadoff-Chu sequence or sequences. Given multiple purposes or characteristics, for example, vertical beams or measurement configurations, there may be a set (or multiple sets) of preambles separate from the cell's existing full set of preambles and each purpose or characteristic may be associated with a subset of that set (or one of those sets).

One set of preambles may be designated for a group of purposes or characteristics, for example, a group of vertical beams or measurements (or measurement configurations). Given N purposes or characteristics in the group, the set of preambles may be divided, for example, equally, among the group with understanding between the WTRU and eNB, for example, based on explicit or implicit configuration, as to which preambles correspond to which member of the group. When measurements are the characteristic, the understanding may, for example, be based on the measurement identity or the order of the measurement configurations, such that if a WTRU chooses a RA preamble based on a particular measurement meeting a criteria, it knows from which set of preambles to choose.

The set of RA preambles may be the preambles in the existing Group A and/or B. In this case, preamble may not be used by the eNB to understand the purpose or characteristic.

The RA preamble format for the set of preambles may be different. For example, one or more certain CP lengths, for example, longer than currently used for a given preamble format, may be used for a certain purpose or characteristic.

For the set of PRACH resources which may be used for a certain purpose or characteristic, one or more of the following may apply.

The frequency allocation of the PRACH resources may be separate or different from the frequency allocation for the cell's existing set of PRACH resources. Each purpose or characteristic may have its own frequency resource where the starting RB may be designated. One new frequency resource may be designated for a group of purposes or characteristics, for example, all vertical beams or all of a certain type of measurement.

The time allocation of the PRACH resources may be separate or different from the time allocation for the cell's existing set of PRACH resources. Each purpose or characteristic may have its own time allocation. One new time allocation may be designated for a group of purposes or characteristics, for example, all vertical beams. The time allocation for one or a group of purposes or characteristics may be accomplished by designation of a specific PRACH configuration index and/or PRACH Mask index where the configurations and masks corresponding to these indices may be those which currently exist, for example, for all purposes/characteristics and/or new configurations and masks may be used. For the case of a group of purposes or characteristics, if one PRACH configuration index is provided, the WTRU may understand how to divide the time resources among the members of the group based on, for example, certain configuration information it may receive such as beam or measurement identities or the order of beams or measurements configured or in a configuration. To minimize impact to a system when there may be a number of purposes or characteristics, the time allocation for a purpose or characteristic may be sparser than currently allowed, for example, sparser than every other frame.

A WTRU may select or otherwise determine a RA resource to use for RA transmission, or a set of RA resources which may be used for RA transmission, based on at least one of the following: one or more measurements; WTRU determination that one or more measurements meet a certain criteria; the result of a comparison made by the WTRU of at least one measurement against one or more quality criteria or thresholds; the result of a comparison of two or more measurements; WTRU selection of a measurement based on certain criteria being met and/or the results of comparison with one or more other measurements; and the association of a measurement with one or a set of RA resources.

The result of a comparison made by the WTRU of at least one measurement against one or more quality criteria or thresholds. For example, the selection or determination may be based on the WTRU determining that a measurement is better (or worse) than a threshold. Better may mean greater in value and worse may mean lower in value. For example, the WTRU may make an RSRP measurement using the CRS of the cell and if that measurement is above a threshold, the WTRU may determine that the cell's existing set of RA resources (for example, RA resources which may not be associated with a certain purpose or characteristic such as vertical beamforming) may be used.

The result of a comparison of two or more measurements. For example, the selection or determination may be based on the WTRU determining that a measurement is better (or worse) than at least one other measurement. For example, the selection or determination may be based on the WTRU determining a measurement is the best of a set of measurements. Better may mean greater in value, for example by at least a certain threshold. Worse may mean lower in value, for example by at least a certain threshold. Other quality criteria instead of or, in addition to, value may be used to determine whether one measurement is better (or worse) than another measurement. At least one of the measurements may need to meet certain other criteria, for example, quality criteria, to be included in the comparison. For example, a measurement value may need to exceed a threshold in order to be included in the comparison.

WTRU selection of a measurement based on certain criteria being met and/or the results of comparison with one or more other measurements. For example, WTRU selection of a certain measurement as the best measurement which may correspond to the WTRU selection of the best vertical beam.

The association of a measurement with one or a set of RA resources. The association of measurements with RA resources may be configured by the eNB, for example, as described elsewhere herein.

The one or more measurements may be configured by the eNB, which may mean signaled to the WTRU via higher layer signaling, such as broadcast or dedicated RRC signaling. Such configuration may be as described elsewhere herein.

Any thresholds a WTRU may use may be signaled to the WTRU by the eNB, for example by broadcast or dedicated signaling.

The one or more measurements may be made by the WTRU. The comparisons may be performed by the WTRU. The determination as to whether criteria are met may be performed by the WTRU.

When the selection/determination is of a set of RA resources which may be used for transmission, the WTRU may choose the specific RA resource based on rules similar to the existing rules or new rules may be defined.

For example, if there are multiple preambles to choose from, the WTRU may choose one randomly. If there are different preambles to choose from with certain criteria to be met such as for the current Group A and B preambles, the WTRU may choose a preamble taking into account those criteria. If there are multiple frequency resources to choose from, the WTRU may choose one randomly. For the time aspect, the WTRU may choose the first available subframe in the set of RA resources in which it is permitted to transmit the preamble and may meet its time constraints.

In one example, a WTRU may make at least two measurements. The WTRU may compare the measurements and determine which measurement is best. The WTRU may select or determine the set of RA resources associated with the determined best measurement. The WTRU may then select or determine an RA resource from within the determined set of RA resources and the WTRU may use that resource for RA transmission.

In another example, the WTRU may first determine if the measurements meet a certain quality criteria such as whether they exceed a threshold. The WTRU may or may only include measurements in the comparison if they meet the certain criteria. If only one measurement may meet the quality criteria, then that measurement may be considered the best measurement by the WTRU.

In another example, the WTRU may first determine whether a certain criteria is met, such as whether the RSRP of the cell exceeds a threshold. If that criteria is met, then the WTRU may use the legacy RA resources for RA transmission. If the criteria is not met, then the WTRU may determine which RA resources to use based on the results of comparisons of measurements associated with RA resources.

The measurement may be a reference signal (RS), where the reference signal may be: a cell-specific RS (CRS), a channel-state information (CSI) RS, a vertical beam (VB) RS, or any other RS or known signal which may be received by the WTRU or transmitted by an eNB.

If measurements of different types are to be compared by the WTRU, the eNB may provide parameters to the WTRU to enable the WTRU to adjust one or more of the measurements prior to comparison, for example, to better correlate the measurements.

The WTRU may make and compare measurements that are for all purposes and characteristics (for example, existing or legacy measurements) with measurements which may be associated with certain purposes or characteristics.

The WTRU may do this without additional configuration from the eNB regarding the existing/legacy measurements. The WTRU may understand that these are associated with existing/legacy RA resources.

The WTRU may be provided with multiple, for example, one or more sets of RA resources that the WTRU may understand are to be used for certain purposes or characteristics. For example, the WTRU may understand that each RA resource set corresponds to a different vertical beam (where the WTRU may or may not know what each beam direction is), measurement, or measurement configuration. One of these sets may be the RA resource set which may be used for existing/legacy purposes.

The WTRU may, for example, if it has no knowledge of which set of resources may be better, do one or more of the following: choose, for example, randomly, one set from the multiple RA resource sets; select a RA resource within the set according to the selection rules (for example, random selection of preamble in the set, first available subframe in the set that may meet the physical timing constraints, and the like); perform the RA procedure (which may include transmitting the selected preamble at a certain power); wait for a RAR; and if no reply is received, the WTRU may ramp the power up and try again, which may include repeating the RA resource selection from the currently selected RA resource set and ramping power until it receives an RAR or reaches the maximum allowed power ramping or ramping attempts.

If the WTRU reaches the maximum allowed power ramping or ramping attempts, the WTRU may then select, for example, randomly, another set of RA resources if one exists and then try again.

The order in which the WTRU chooses a set of RA resources may be according to one or more of the following.

The WTRU may select the RA set to be used for existing/legacy purposes first. The WTRU may determine to select the RA set to be used for existing/legacy purposes first if it determines a measurement, such as a RSRP measurement, exceeds a certain threshold.

The WTRU may select an RA resource set randomly from the multiple sets provided.

Each time a WTRU selects an RA set, it may select the set randomly from the multiple sets provided or from the subset of the multiple sets that does not include a set already tried.

The WTRU may select an RA resource set according to an order configured by the eNB where such configuration may be signaled to the WTRU by the eNB via signaling, such as broadcast or dedicated RRC signaling.

The WTRU may use measurements to determine which RA resource set to try first or the order in which to try the RA resource sets. When measurements are used, the WTRU may select the RA resource set that corresponds to the measurement or measurement configuration that meets a certain criteria.

An eNB may use measurements of SRS transmissions from a WTRU to determine a preferred beam direction for UL reception from and/or DL transmission to the WTRU.

The eNB may use aperiodic SRS to cause the WTRU to transmit SRS at specific time.

To enable the eNB to get a number of SRS transmissions, for example to enable convergence of the beam direction, the eNB may trigger aperiodic SRS a number of times, where such triggers may be closely spaced in time. For example, the eNB may trigger N aperiodic SRS for a WTRU such that the WTRU is scheduled to transmit and/or transmits SRS in N consecutive WTRU-specific SRS subframes. Consecutive WTRU-specific SRS subframes may not be consecutive subframes, since only certain subframes may be WTRU-specific SRS subframes.

To enable the eNB to get a number of SRS transmissions, for example to enable convergence of the beam direction, the eNB may trigger a multi-shot aperiodic SRS which may yield the result that the WTRU is scheduled to transmit and/or transmits SRS in N consecutive WTRU-specific SRS subframes. The first subframe in which the WTRU transmits SRS may be the first WTRU-specific subframe that is at least k subframes after the subframe in which the trigger is received, where k may be 4. N may be a known value, a configured value, or a value provided with the trigger.

It may be useful for the eNB to receive a PHR after the vertical beam has converged.

To accomplish this, the WTRU, for example, may trigger a PHR according to at least one of the following: upon receipt of an aperiodic SRS request which may also include a PHR request; a certain time T, or a number of TTIs or subframes S, after receiving an aperiodic SRS request; a certain time T, or a number of TTIs or subframes S, after transmitting an aperiodic SRS; a certain time T, or a number of TTIs or subframes S, after transmitting the last of the N SRS transmissions triggered by a multi-shot aperiodic SRS request; and a certain time T, or a number of TTIs or subframes S, after receiving a group of closely spaced aperiodic SRS requests. For example, if a WTRU receives an aperiodic SRS request in the span of less than B ms, the WTRU may trigger PHR C ms or TTIs or subframes after the last trigger or after the last SRS it transmits in that time span.

The time T or number of subframes S may be at least one of: a known value, for example, by a rule; configured such as by higher layer signaling; included with the aperiodic SRS request; selected, such as from a set of known or configured values, by an indication which may be included in the aperiodic SRS request; or greater than or equal to 0.

PHR may or may only be triggered based on receipt of an aperiodic SRS request if the aperiodic SRS request includes a PHR request.

If it is not possible for the WTRU to transmit the PHR, for example if there are no UL resources allocated for new transmission in which the PHR may fit, when the PHR is triggered, the WTRU may transmit the PHR at the soonest later time when transmitting a PHR is possible.

Once the criteria for triggering an aperiodic SRS related PHR has been met, the WTRU may continue to trigger this PHR until the PHR is transmitted or able to be transmitted.

For the DL, an eNB with 3D-MIMO/3D-beamforming capabilities in general may require DL CSI to precisely shape the beam for a specific WTRU, which may be called WTRU-specific beamforming. The DL CSI may be obtained with the above proposed CSI feedback including PMI/CQI/RI/RSRP/PTI/CPI and the like. The eNodeB may also predefine a set of vertical beams (within a single horizontal cell). As mentioned above, each vertical beam may be associated with a specific CSI-RS configuration. To support $N_v$ vertical beams, $N_v$ CSI-RS configurations may be used for a WTRU to measure the multiple vertical beams. A WTRU may measure and report channel state information (CSI) based on a single or multiple CSI-RS configurations. The CSI-RS and d-BTRS may be interchangeably used herein. Therefore multiple CSI-RS configurations may be equivalent to the multiple d-BTRS. In addition, the d-BTRS may be whole or a subset of the antenna ports in a CSI-RS configuration, which may include the solution that a single CSI-RS configuration with N-ports may be divided into multiple subsets and each subset corresponding to a d-BTRS.

As a WTRU moves from one location to another location (in the vertical and/or horizontal domain), the desired WTRU-specific 3-D beam (vertical and/or horizontal) may have changed in either the vertical domain, the horizontal domain, or both. Thus the desired WTRU-specific beam may need to be updated either through a WTRU or an eNodeB triggered event. To support WTRU-specific 3D beamforming, one or more of following may apply.

For any given TTI, a WTRU may measure all the CSI-RS configurations and report the multiple CSI information (representing the vertical beam quality). This may introduce excessive feedback overhead. Alternatively, a WTRU autonomous behavior may be needed to report the best or preferred vertical beam when the desired vertical beam of the WTRU changes due to movement.

The procedure may be defined as follows. A WTRU k may calculate its wideband SINR $\gamma_k(H_k, V_k)$ as a function of channel state information and applied vertical beamforming (reflected in a current active CSI-RS port). The WTRU may measure all the configured CSI-RS ports and calculate the SINRs. Once the SINR of the current active CSI-RS port (corresponding to current vertical beam) drops more than a defined threshold compared to other configured CSI-RS ports (representing different vertical beams), for example:

$$\gamma_k^1(H_k^1 V_k^1) - \gamma_k^0(H_k^0, V_k^0) > \Gamma_{th}$$

$\gamma_k^0$: SINR at an original location measured on current active CSI-RS port $\gamma_k^1$: SINR at a new location measured on any other configured CSI-RS port $\Gamma_{th}$: SINR threshold for beam reselection the WTRU may then report back the strongest CSI-RS port associated with the measured strongest SINR along with an indication of beam update. The eNB may accordingly update the active vertical beam for the WTRU for future transmission. The active vertical beam update may include reconfiguration of the active CSI-RS port. The SINR metric may be replaced with RSRP or RSRQ with the same procedure. Either subband or wideband CSI may be used.

A WTRU may be triggered to report the preferred CSI-RS configuration among the multiple CSI-RS configurations by one or more of following.

The preferred CSI-RS configuration may be defined as at least one of: the CSI-RS configuration having the highest wideband CQI (or RSRP) value among the set of CSI-RS configurations, or the CSI-RS configuration a WTRU preferred to report for CSIs including CQI/PMI and/or RI.

An eNB may trigger to report the preferred CSI-RS configuration among the multiple CSI-RS configurations from a DCI. A triggering bit may be included in the DCI and if the triggering bit indicates '0', the WTRU may not report the preferred CSI-RS configuration and if the triggering bit indicates '1', the WTRU may report the preferred CSI-RS configuration in the corresponding UL subframe. The corresponding UL subframe may be n+4, where n is the subframe index where the WTRU received the triggering.

A WTRU may report the preferred CSI-RS configuration if at least one of following conditions is satisfied. The previous preferred CSI-RS configuration has a lower wideband CQI (or RSRP) than any of the other CSI-RS configurations in a subframe k and the gap between the best CSI-RS configuration and the previous preferred CSI-RS configuration is larger than a predefined threshold value. The CSI-RS configuration having the highest wideband CQI (or RSRP) is changed and the gap is larger than a predefined threshold.

A WTRU may be configured to report the preferred CSI-RS configuration periodically. For instance, in every $N_{cycle}$ [ms], a WTRU may report a preferred CSI-RS configuration. In this case, one or more of following may apply:

The preferred CSI-RS configuration may be reported as $V_{index}$ and the $V_{index}$ may be reported by any one of: separately from PMI/RI/CQI and/or PTI, or via the PUCCH using PUCCH format 2/2a/2b.

The preferred CSI-RS configuration (for example, $V_{index}$) may be reported via the PUSCH in a piggybacked manner. In this case, the location of the Vindex may be the same as the RI.

A WTRU may be configured with multiple CSI-RS configurations while the CSI reporting (for example, CQI/PMI/RI and/or PTI) may be based on an associated CSI-RS configuration, where the associated CSI-RS configuration may be informed by the eNB. In this case, one or more of following may apply:

The associated CSI-RS configuration may be informed via higher layer signaling. The associated CSI-RS configuration may be indicated in a DCI for UL grant if aperiodic CSI reporting is used. A WTRU may report the preferred CSI-RS configuration via higher layer signaling. The associated CSI-RS configuration may be informed implicitly by confirming that the eNB received the preferred CSI-RS configuration reporting. Thus, right after the confirmation, the WTRU may measure CSI based on the reported preferred CSI-RS configuration. The multiple CSI-RS configurations may be measured only for reporting the preferred CSI-RS configuration.

The multiple CSI-RS configurations are cell-specific, which is different from WTRU-specific CSI-RS configuration. A WTRU may measure cell-specific CSI-RS configurations (for example, d-BTRS) for reporting preferred CSI-RS configuration, while the WTRU may measure WTRU-specific CSI-RS configurations for CSI reporting for one or more transmission points. In this case, one or more of following may apply:

A WTRU may report based on cell-specific CSI-RS configurations if one or more of following conditions are met. The previous preferred cell-specific CSI-RS configuration has a lower wideband CQI (or RSRP) than any of other cell-specific CSI-RS configurations in a subframe k and the gap between the best cell-specific CSI-RS configuration and the previous preferred cell-specific CSI-RS configuration is larger than a predefined threshold value. The cell-specific CSI-RS configuration the having highest wideband CQI (or RSRP) is changed and the gap is larger than a predefined threshold.

A WTRU may report based on WTRU-specific CSI-RS configurations if the eNB configures periodic CSI reporting or triggers aperiodic CSI reporting.

In the case of line of sight (LoS), the above beam reselection may be complemented with a direction of arrival-triggered beam update. The eNB may decide and change the beam for the WTRU based on qualified trigger events. This case is suitable for the LoS case only and low mobility.

The eNB may detect the direction of arrival (DoA) for both azimuth and elevation from each WTRU. Once the measured DoA change from a WTRU reaches a threshold, the eNB may adjust the WTRU to a new direction-based pre-defined vertical beam.

Figure 14:
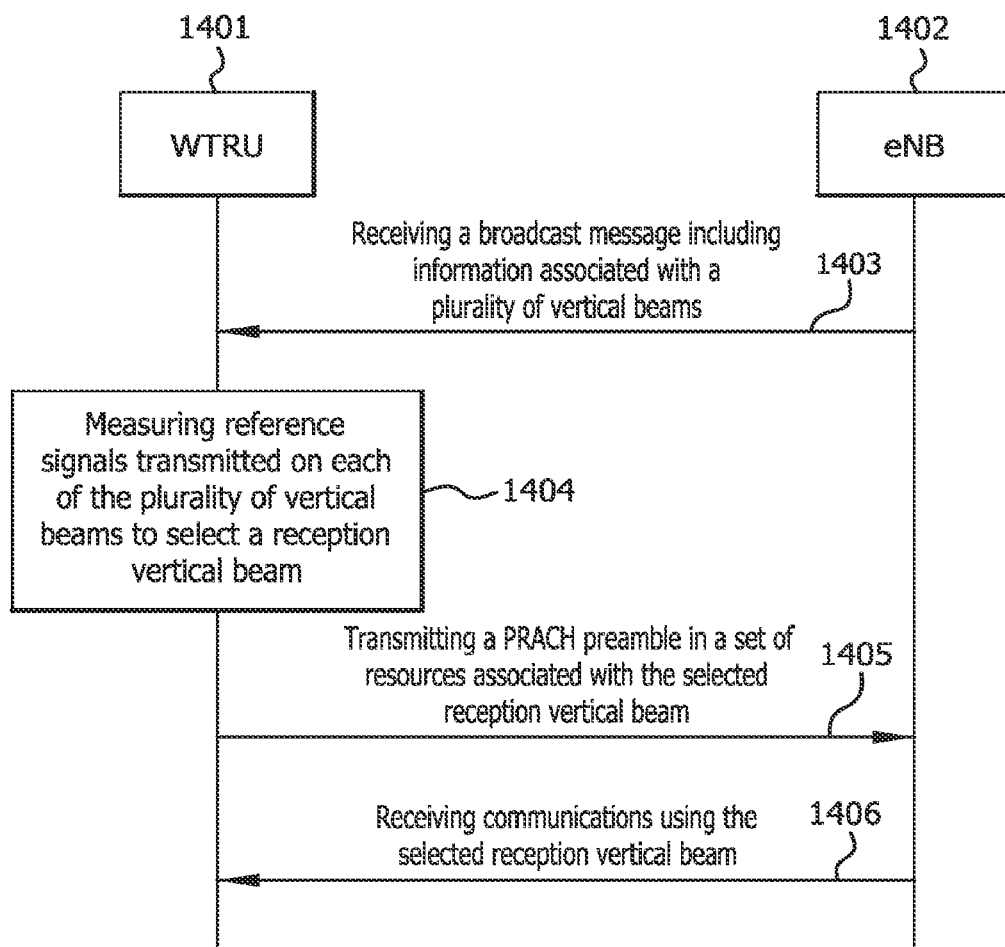
FIG. 14 is an example method for receiving a reception vertical beam.

FIG. 14 is an example method for receiving a reception vertical beam. A wireless transmit/receive unit (WTRU) 1401 may receive 1403 a broadcast message from an evolved Node B (eNB) 1402 that includes information associated with a plurality of vertical beams, wherein the information includes at least one set of Physical Random Access Channel (PRACH) resources associated with each of the plurality of vertical beams. The WTRU 1401 may measure 1404 reference signals transmitted on each of the plurality of vertical beams to select a reception vertical beam. The WTRU 1401 may transmit 1405 a PRACH preamble in a set of resources associated with the selected reception vertical beam. The WTRU 1401 may receive 1406 communications from the eNB 1402 using the selected reception vertical beam.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a non-transitory computer-readable medium for execution by a computer or processor. Examples of non-transitory computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a wireless transmit/receive unit (WTRU) for determining resources, the method comprising:
   measuring, by the WTRU, a plurality of beam reference signals transmitted from a base station;
   selecting, by the WTRU, a beam reference signal from among the plurality of measured beam references signals;
   receiving, by the WTRU, a configuration message, wherein the configuration message is at least one of a broadcast message or a radio resource control (RRC) message, from the base station that includes correspondence information regarding the plurality of measured beam reference signals, wherein the correspondence information includes information regarding designation of at least one set of Physical Random Access Channel (PRACH) resources for each of the plurality of measured beam reference signals;
   determining, by the WTRU, a set of PRACH resources for the selected beam reference signal based on the information regarding designation of at least one set of PRACH resources for each of the plurality of measured beam reference signals included in the received correspondence information; and
   transmitting, by the WTRU, a PRACH signal transmission using at least one PRACH resource of the determined set of PRACH resources.

2. The method of claim 1, wherein the correspondence information regarding the plurality of measured beam reference signals includes a plurality of measurement configurations.

3. The method of claim 1, wherein the determined set of PRACH resources includes at least one PRACH preamble and wherein the PRACH transmission is a PRACH preamble in the determined set of PRACH resources.

4. The method of claim 1, wherein the WTRU selects the beam reference signal based on a determination that a measured beam reference signal power is better than a threshold on at least one beam reference signal.

5. The method of claim 1, wherein the at least one set of PRACH resources is portioned based on the number of the plurality of beam reference signals.

6. The method of claim 1, wherein the beam reference signals are Channel State Information-Reference Signals (CSI-RSs).

7. The method of claim 1, wherein the determined set of PRACH resources includes at least one set of time resources and wherein the PRACH transmission is transmitted in one of the time resources of the set of time resources.

8. The method of claim 1, wherein the beam is a 3-D beam.

9. The method of claim 1, further comprising:
determining, by the WTRU, the PRACH transmission based on the received correspondence information.

10. A wireless transmit/receive unit (WTRU) for determining resources, the WTRU comprising:
a processor, operatively coupled to a transceiver, the processor and the transceiver configured to measure a plurality of beam reference signals transmitted from a base station;
the processor configured to select a beam reference signal from among the plurality of measured beam references signals;
the transceiver configured to receive a configuration message, wherein the configuration message is at least one of a broadcast message or a radio resource control (RRC) message, from the base station that includes correspondence information regarding the plurality of measured beam reference signals, wherein the correspondence information includes information regarding designation of at least one set of Physical Random Access Channel (PRACH) resources for each of the plurality of measured beam reference signals;
the processor configured to determine a set of PRACH resources for the selected beam reference signal based on the information regarding designation of at least one set of PRACH resources for each of the plurality of measured beam reference signals included in the received correspondence information; and
the processor and the transceiver configured to transmit a PRACH transmission using at least one PRACH resource of the determined set of PRACH resources.

11. The WTRU of claim 10, wherein the correspondence information regarding the plurality of measured beam reference signals includes a plurality of measurement configurations.

12. The WTRU of claim 10, wherein the determined set of PRACH resources includes at least one PRACH preamble and wherein the PRACH transmission is a PRACH preamble in the determined set of PRACH resources.

13. The WTRU of claim 10, wherein the processor selects the beam reference signal based on a determination that a measured beam reference signal power is better than a threshold on at least one beam reference signal.

14. The WTRU of claim 10, wherein the at least one set of PRACH resources is portioned based on the number of the plurality of beam reference signals.

15. The WTRU of claim 10, wherein the beam reference signals are Channel State Information-Reference Signals (CSI-RSs).

16. The WTRU of claim 10, wherein the determined set of PRACH resources includes at least one set of time resources and wherein the PRACH transmission is transmitted in one of the time resources of the set of time resources.

17. The WTRU of claim 10, wherein the beam is a 3-D beam.

18. The WTRU of claim 10, further comprising:
the processor further configured to determine the PRACH transmission based on the received correspondence information.

19. A method for use in a wireless transmit/receive unit (WTRU) for determining resources, the method comprising:
measuring, by the WTRU, a plurality of beam reference signals transmitted from a base station;
selecting, by the WTRU, a beam reference signal from among the plurality of measured beam references signals;
receiving, by the WTRU, a configuration message, wherein the configuration message is at least one of a broadcast message or a radio resource control (RRC) message, from the base station that includes correspondence information regarding the plurality of measured beam reference signals, wherein the correspondence information includes information regarding designation of at least one set of Physical Random Access Channel (PRACH) preambles, wherein the at least one set of PRACH preambles includes one or more PRACH preambles, for each of the plurality of measured beam reference signals;
determining, by the WTRU, a set of PRACH preambles for the selected beam reference signal based on the information regarding designation of at least one set of PRACH resources for each of the plurality of measured beam reference signals included in the received correspondence information; and
transmitting, by the WTRU, a PRACH preamble of the determined set of PRACH preambles.

20. The method of claim 19, wherein the correspondence information regarding the plurality of measured beam reference signals includes a plurality of measurement configurations.

* * * * *